United States Patent [19]

Ueda et al.

[11] Patent Number: 4,493,714
[45] Date of Patent: Jan. 15, 1985

[54] ULTRATHIN FILM, PROCESS FOR PRODUCTION THEREOF, AND USE THEREOF FOR CONCENTRATING A SPECIFIED GAS IN A GASEOUS MIXTURE

[75] Inventors: Fumio Ueda; Eiichi Hashimoto; Takeyoshi Yamada; Koh Mori, all of Iwakuni, Japan

[73] Assignee: Teijin Limited, Osaka, Japan

[21] Appl. No.: 491,536

[22] Filed: May 4, 1983

[30] Foreign Application Priority Data

| May 6, 1982 | [JP] | Japan | 57-74476 |
| Sep. 17, 1982 | [JP] | Japan | 57-160810 |
| Sep. 17, 1982 | [JP] | Japan | 57-160811 |
| Sep. 17, 1982 | [JP] | Japan | 57-160814 |

[51] Int. Cl.$^3$ .................................. B01D 53/22
[52] U.S. Cl. .................................. 55/16; 55/68; 55/158
[58] Field of Search .................. 55/16, 68, 158; 210/500.2

[56] References Cited

U.S. PATENT DOCUMENTS

| Re. 30,351 | 7/1980 | Hoehn et al. | 55/16 |
| 2,970,106 | 1/1961 | Binning et al. | 55/16 X |
| 3,661,634 | 5/1972 | Riley et al. | 210/500.2 X |
| 3,822,202 | 7/1974 | Hoehn | 55/16 |
| 4,039,440 | 8/1977 | Cadotte | 210/500.2 X |
| 4,142,020 | 2/1979 | Okamura et al. | 210/500.2 X |
| 4,230,463 | 10/1980 | Henis et al. | 55/158 X |
| 4,367,135 | 1/1983 | Posey, Jr. | 55/16 X |

FOREIGN PATENT DOCUMENTS

105203  6/1982  Japan .
590962  3/1981  U.S.S.R. .

*Primary Examiner*—Robert Spitzer
*Attorney, Agent, or Firm*—Wenderoth, Lind & Ponack

[57] ABSTRACT

An ultrathin film composed substantially of silicon-containing polyurea comprising polyaddition bonded units derived from (A) at least one polyamine selected from the group consisting of silicon-containing polyamines and hydrocarbon-type polyamines, each of said polyamines containing at least two primary or secondary amino groups in the molecule, and (B) at least one polyisocyanate compound selected from the group consisting of silicon-containing polyisocyanates and hydrocarbon-type polyisocyanates, each of said polyisocyanates having at least two isocyanate groups in the molecular chains;

provided that when the polyisocyanate compound is the hydrocarbon-type polyisocyanate alone, at least one of the selected polyamines is a silicon-containing polyamine containing at least one terminal amino group in the molecule.

A composite structure composed of microporous supporting film and the ultrathin film supported thereon is useful for the production of a gaseous mixture containing a specified gas in a high concentration from a mixture of two or more gases including said specified gas, and is prepared by subjecting the polyamine and the polyisocyante compound to interfacial polyaddition reaction on a microporous supporting film to form an ultrathin film composed substantially of a silicon-containing polyurea on the microporous supporting film.

21 Claims, No Drawings

ULTRATHIN FILM, PROCESS FOR PRODUCTION THEREOF, AND USE THEREOF FOR CONCENTRATING A SPECIFIED GAS IN A GASEOUS MIXTURE

This invention relates to an ultrathin film, a process for its production, and its use for concentrating a specified gas such as oxygen in a gaseous mixture such as air.

Devices which utilize combustion energy, for example household heaters, automobile engines and boilers, are designed and operated on the basis of the fact that oxygen is present in a concentration of about 20% in the air. Actually, however, environmental pollution by incomplete combustion gives rise to a problem.

If oxygen enriched air can be easily supplied, it will result in solving the environmental pollution problem by incomplete combustion and the efficiency of combustion can be increased.

Oxygen enriched air is also useful for respiration of patients with respiratory diseases and immature infants.

A practical method of obtaining oxygen enriched air is to selectively separate and concentrate oxygen in atmospheric air by using a polymeric membrane.

The technical difficulty in separating a specified gas such as oxygen from a gaseous mixture such as air lies in the development of a material which can permit permeation of the specified gas with sufficient selectivity and at a sufficient permeation speed, and as a practical matter, in the establishment of a technique for producing a very thin film from such a material.

A homopolymer of 4-methylpentene and a mixture of the 4-methylpentene homopolymer and an organopolysiloxane-polycarbonate copolymer have previously been known as materials for gas separating membranes (see U.S. Pat. Nos. 4,132,824 and 4,192,842). As described in these U.S. Patents, production of a very thin film from these materials is by a batchwise method which comprises dropping a solution of a starting polymer in a water-immiscible organic solvent into a water surface to allow the solution to spread spontaneously over the water surface. This method requires improvements in that a single layer of such very thin film produced has too large pores to be used for selective separation of a specified gas, and the method is batchwise and not continuous.

U.S. Pat. No. 4,155,793 proposes for continuously producing a thin film having few pores in which two layers of very thin film formed on the water surface are superimposed and held on a web support, in order to achieve the aforesaid improvements.

European Laid-Open Patent Application No. 0031725 (laid-open on July 8, 1981) proposes a process for producing an ultrathin film having a large area, in which an organic compound capable of reducing surface tension between water and a polymer solution is caused to be present in a solution of a hydrocarbon-type addition polymer in a water-immiscible organic solvent, and thereby the polymer solution is allowed to spread spontaneously with rapidity over a broad area on the water surface.

These methods are characteristic in that an ultrathin film is formed on the surface of water as described above. According to these methods which involve forming a film on a water surface, it is impossible, as a practical matter, to obtain a single film which has so few pores as to be usable for separating a specified gas from a gaseous mixture, and therefore, unless a plurality of such films are laminated, feasible gas separating membrane cannot be provided.

The defect of laminating a plurality of films is that the permeating distance of a gas becomes correspondingly longer, and therefore the rate of permeation becomes lower.

In addition to the aforesaid methods which involve forming an ultrathin film from an organic solvent solution of a polymer, there is also known a method which comprises crosslinking a polymer on a porous support to form a crosslinked polymer film on the porous support (see Japanese Laid-Open Patent Publication No. 105,203/1982). This method is for producing a permselective membrane obtained by crosslinking polysiloxane having a major proportion of recurring units of the formula

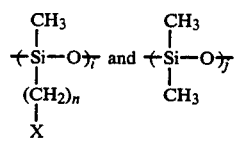

wherein X represents $NH_2$, or a residue of an aliphatic or alicyclic compound having 1 to 4 primary or secondary amino groups, one end of the amino group being bonded to the group —$CH_2$—$_n$, n is an integer of 1 to 10, and i and j as molar fractions having the following relation: $i+j=1.0$, $0.1 \leq i \leq 1$, and $0 \leq j \leq 0.9$.

The specification of this Japanese patent document discloses (1) a method which comprises coating a uniform solution containing the polysiloxane and a crosslinking agent in a thin uniform layer on a porous support and drying it, or (2) a method which comprises coating the polysiloxane alone on a porous support and then crosslinking only the surface of the coated layer. This Japanese patent document also describes that the permselective membrane is used as an oxygen enriching membrane or a reverse osmosis membrane. Production of the oxygen enriching membrane is described in Example 1 of this patent document in which a methanol solution containing the polysiloxane and diethylene glycol diglycidyl ether as a crosslinking agent is used in accordance with the method (1) mentioned above. Example 2 discloses the method (2) mentioned above which comprises applying an aqueous solution of the polysiloxane to a porous support, drying it with hot air to 80° C. for 20 minutes to form a film of the polysiloxane on the porous support, then applying an n-hexane solution of isophthaloyl chloride, and drying it with hot air at 120° C. for 10 minutes thereby to crosslink only the surface of the polysiloxane coating.

The above-cited Japanese Laid-Open Patent Publication discloses the two methods of producing crosslinked membranes, but fails to disclose specifically a method for producing a very thin film composed of silicon-containing polyurea. Investigations of the present inventors have shown that an ultrathin film of silicon-containing polyurea having excellent selectivity and high rates of permeation cannot be produced by any of the two methods disclosed in the above-cited Japanese patent document.

Russian Pat. No. 590,962 discloses polyurea formed from a silicon-containing diisocyanate represented by the following formula

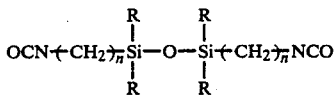

wherein n is 1 or 3, and R is CH₃ or C₆H₅, and m-xylylenediamine, 4,4'-diaminodicyclohexylmethane, ethylenediamine, N,N'-dimethylethylenediamine or 1,2-propylenediamine. However, the Russian Patent fails to describe anything about an ultrathin film, a process for its production and its use.

It is an object of this invention therefore to provide a novel ultrathin film consisting essentially of silicon-containing polyurea.

Another object of this invention is to provide a novel ultrathin film substantially free from large pores permeable to a gaseous mixture itself, a single such ultrathin film having the ability to separate a specified gas such as oxygen with good selectivity from a gaseous mixture such as air.

Still another object of this invention is to provide an ultrathin film which is substantially free from large pores and therefore obviates the need to use a plurality of such ultrathin films in the laminated state, and to achieve by such an ultrathin film equivalent selectivity to a conventional known gas separating membrane at a higher rate of permeation.

Still another object of this invention is to provide an ultrathin film which has a broad range of gas separating properties ranging from high selectivity for a specified gas and a low permeation coefficient to low selectivity for the gas and a high permeation coefficient, and can be used selectively for a particular desired use.

Still another object of this invention is to provide an ultrathin film which, in the production of oxygen-enriched air from air, exhibits a broad range of oxygen separating performances represented by a selectivity, defined as the ratio of the coefficient of oxygen permeation to the coefficient of nitrogen permeation, of from about 2 to about 6 and a coefficient of oxygen permeation of from $10^{-8}$ to $10^{-10}$ cc·cm/cm²·sec·cmHg, for example a high-performance ultrathin film which has a selectivity of about 3 and a coefficient of oxygen permeation of about 0.5 to about $1 \times 10^{-8}$ cc·cm/cm²·sec·cmHg, and therefore, can produce at a very high rate of permeation oxygen enriched air containing oxygen in a concentration fully satisfactory for practical purposes.

Still another object of this invention is to provide an ultrathin film which has heat resistance and therefore can be used for separating a gaseous mixture kept at a high temperature and can separate a specified gas at a very fast rate of permeation at a high temperature.

Still another object of this invention is to provide a composite structure in the form of a hollow fiber composed of a hollow fiber having a microporous circumferential wall membrane and the ultrathin film of the invention supported on said circumferential wall membrane.

Still another object of this invention is to provide a composite structure in the form of a flat membrane composed of a microporous flat membrane and the ultrathin film of the invention supported thereon.

Yet another object of this invention is to provide a process for producing the composite structure of the invention composed of a microporous support film and the ultrathin film of the invention supported thereon, which comprises poly-addition reaction of a polyamine and a polyisocyanate on the microporous support film to form the ultrathin film of the invention composed of silicon-containing polyurea.

Other objects and advantages of this invention will become apparent from the following description.

According to this invention, these objects and advantages of the invention are achieved by an ultrathin film composed substantially of silicon-containing polyurea comprising polyaddition bonded units derived from (A) at least one polyamine selected from the group consisting of silicon-containing polyamines having in the molecule at least two units of the following formula

wherein R³ represents a monovalent hydrocarbon group or a fluorocarbon group, R¹ and R² are identical or different and represent a hydrogen atom or a monovalent hydrocarbon group which may have a primary or secondary amino group, or R¹ and R² may be bonded to each other to form an alkylene group interrupted by the nitrogen atom forming the secondary amino group, and n is an integer of 1 to 10, provided that R¹ and R² are not simultaneously aliphatic, alicylic or aromatic groups free from the amino group, not all, but at least one, of the units of formula (I) forming a unit represented by the following formula

wherein R¹, R², R³ and n are as defined, the free bond from the silicon atom is bonded directly to another carbon atom, and the free bond from the oxygen is bonded directly to another silicon atom, and hydrocarbon-type polyamines containing at least two primary or secondary amino groups in the molecule, and (B) at least one polyisocyanate compound selected from the group consisting of silicon-containing polyisocyanates having at least 2 isocyanate groups in the molecular chains and hydrocarbon-type polyisocyanates having at least 2 isocyanate groups in the molecular chains; provided that when the polyisocyanate compound is the hydrocarbon-type polyisocyanate alone, at least one of the selected polyamines is a silicon-containing polyamine containing in the molecule at least one unit of formula (I)-a in which the free bond from the silicon atom is bonded to a monovalent hydrocarbon group.

The ultrathin film of this invention consists essentially of silicon-containing polyurea comprising polyaddition bonded units derived from the polyamine (A) and the polyisocyanate (B).

It is known that polyaddition reaction of an amine and an isocyanate yields a urea bond (—NHCONH—). The polyaddition bonded units in the present invention have a urea bond in accordance with the aforesaid polyaddition reaction.

The polyamine (A) in this invention may be a silicon-containing polyamine or a hydrocarbon-type polyamine. Likewise, the polyisocyanate (B) in this invention may be a silicon-containing polyisocyanate or a hydrocarbon-type polyisocyanate.

SILICON-CONTAINING POLYAMINE

The silicon-containing polyamine should have at least 2 units of formula (I) in the molecule.

In formula (I), $R^1$ and $R^2$ are identical or different, and each represents a hydrogen atom, or a monovalent hydrocarbon group which may have a primary or secondary amino group. Or $R^1$ and $R^2$ may be bonded to each other to form an alkylene group interrupted by the nitrogen atom forming the secondary amino group.

The monovalent hydrocarbon group may have a primary or secondary amino group as a substituent.

Preferred monovalent hydrocarbon groups free from the amino group include, for example, alkyl groups, alicyclic groups, aromatic groups and aralkyl groups. Especially preferred monovalent hydrocarbon groups are alkyl groups having 1 to 12 carbon atoms, alicyclic groups having 6 to 15 carbon atoms, aromatic groups having 6 to 15 carbon atoms, and aralkyl groups having 7 to 15 carbon atoms.

The alkyl groups having 1 to 12 carbon atoms and containing no amino group may be linear or branched, or may be substituted by an alicyclic group. Examples include methyl, ethyl, propyl, butyl, pentyl, hexyl, heptyl, octyl, nonyl, decyl, undecyl, dodecyl, cyclohexylmethyl, and cyclohexylethyl.

Examples of the alicyclic groups having 6 to 15 carbon atoms and containing no amino group are cyclohexyl groups which may be substituted by an alkyl group, as represented by the following formula

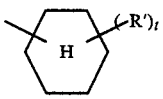

wherein R' is an alkyl group having 1 to 5 carbon atoms, and t is 0, 1 or 2, such as cyclohexyl, methylcyclohexyl and dimethylcyclohexyl.

Examples of the aromatic groups having 6 to 15 carbon atoms and containing no amino group are a phenyl group which may be substituted by an alkyl group, as represented by the following formula

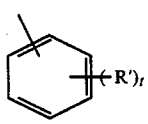

wherein R' and t are as defined above; a naphthyl group which may be substituted by an alkyl group, as represented by the following formula

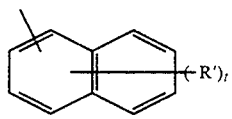

wherein R' and t are as defined above; and a diphenyl group which may be substituted by an alkyl group, as represented by the following formula

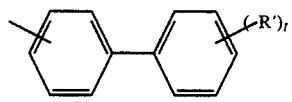

wherein R' and t are as defined above.

Specific examples of the phenyl group which may be substituted by an alkyl group are phenyl, tolyl, ethylphenyl, dimethylphenyl and cumyl.

Examples of the naphthyl group which may be substituted by an alkyl group are 1-naphthyl, 2-naphthyl, methylnaphthyl and ethylnaphthyl.

Examples of the diphenyl group which may be substituted by an alkyl group are 1-, 2-, or 3-diphenyl, and methyldiphenyl.

Examples of the aralkyl groups having 7 to 15 carbon atoms and containing no amino group are phenylalkyl groups which may be substituted by an alkyl group, as represented by the following formula

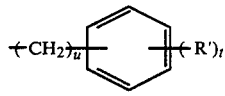

wherein R' and t are as defined above, and u is 1 or 2, such as benzyl, (methylphenyl)methyl, α-phenethyl, and β-phenethyl.

Preferred monovalent hydrocarbon groups having an amino group include alkyl groups, alicyclic groups, aromatic groups, and aralkyl groups, especially alkyl groups having 2 to 12 carbon atoms, alicyclic groups having 6 to 15 carbon atoms, aromatic groups having 6 to 15 carbon atoms, and aralkyl groups having 7 to 15 carbon atoms, which have an amino group.

The alkyl group having an amino group may be one in which the carbon chain is linear or branched, or which may be substituted by an alicyclic group. Examples include 2-aminoethyl, 3-aminopropyl, 4-aminobutyl, 5-aminopentyl, 6-aminohexyl, 7-aminoheptyl, 8-aminooctyl, 9-aminononyl, 10-aminodecyl, 11-aminoundecyl, 12-aminododecyl, 2-(aminocyclohexyl)ethyl, and 3-aminomethylcyclohexyl-1-ylmethyl.

Examples of the alicyclic groups having 6 to 15 carbon atoms and an amino group are substituted cyclohexyl groups represented by the following formula

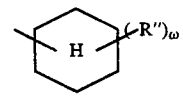

wherein R" represents a hydrogen atom, an amino group, an alkyl group having 1 to 5 carbon atoms, or an aminoalkyl group having 1 to 5 carbon atoms, ω is 1 or 2, when ω is 1, R" represents an amino group or an aminoalkyl group having 1 to 5 carbon atoms, and when ω is 2, the two R" groups may be identical or different but one of them is an amino group or an aminoalkyl group having 1 to 5 carbon atoms, such as 3-aminocyclohexyl, 3-amino-4-methylcyclohexyl, 4-aminomethylcyclohexyl, and 4-(3-aminopropyl)cyclohexyl.

Examples of the aromatic group having 6 to 15 carbon atoms and an amino group are substituted phenyl groups represented by the following formula

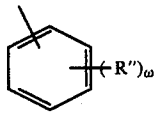

wherein R" and ω are as defined above; substituted naphthyl groups represented by the following formula

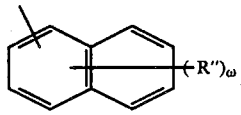

wherein R" and ω are as defined above; and substituted tetralin groups represented by the following formula

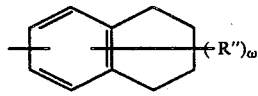

wherein R" and ω are as defined above.

Examples of the substituted phenyl groups are 4-aminophenyl, 3-aminophenyl, 4-aminomethylphenyl and diaminophenyl and the corresponding substituted phenyls in which the amino group is a lower alkylamino group such as methylamino or ethylamino.

Specific examples of the substituted naphthyl groups are aminonaphthyl, diaminonaphthyl and 1-amino-2-methylnaphthyl, and the corresponding substituted naphthyl groups in which the amino group is a lower alkylamino group such as methylamino or ethylamino.

An aminotetralin group is a specific example of the substituted tetralin group.

Examples of the aralkyl group having 7 to 15 carbon atoms and containing an amino group are substituted aralkyl groups represented by the following formula

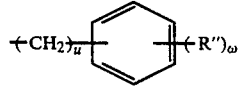

wherein R" and ω are as defined above, and u is 1 or 2, such as (3-aminophenyl)methyl, (4-aminophenyl)methyl, 2-(3-aminophenyl)ethyl, and (4-aminomethylphenyl)methyl.

R¹ and R² may be bonded to each other to form an alkylene group interrupted by the nitrogen atom forming the secondary amino group. The alkylene group may be represented by the following formula

wherein e and f are identical or different and represent 1, 2 or 3, provided that the sum of e and f is 3 to 5, preferably 3 or 4.

Examples of the alkylene group are —CH₂NHCH₂CH₂—, —CH₂CH₂NHCH₂CH₂—, —CH₂NHCH₂CH₂CH₂—, and —CH₂CH₂NHCH₂CH₂CH₂—.

Preferably, either one of R¹ and R² is a hydrogen atom.

R³ is a monovalent hydrocarbon group or a fluorocarbon group. The monovalent hydrocarbon group preferably includes alkyl groups having 1 to 10 carbon atom, cycloalkyl groups having 5 or 6 carbon atoms, a phenyl group and a tolyl group. The fluorocarbon group preferably includes those resulting from substitution of the above-exemplified hydrocarbon groups by fluorine.

Specific examples of the alkyl groups having 1 to 10 carbon atoms and cyclohexyl groups having 5 or 6 carbon atoms are clearly understood from the examples of the alkyl group and alicyclic group for R¹. The fluorocarbon group may be a mono- to per-fluorinated product of the aforesaid hydrocarbon groups. Examples include fluoroalkyl groups having 1 to 10 carbon atoms such as trifluoromethyl, 1-fluoroethyl, 2-fluoropropyl, 2,2-difluoropropyl, 2-fluorobutyl, perfluoropentyl and perfluorohexyl; fluorinated cyclic groups having 5 or 6 carbon atoms such as fluorocyclohexyl and fluorocyclopentyl; and mono- to tetra-fluorophenyl and trifluoromethylphenyl.

n is an integer of 1 to 10, preferably 2 to 6. Accordingly, ―(CH₂)ₙ― represents methylene, dimethylene, trimethylene, tetramethylene, pentamethylene, hexamethylene, decamethylene, for example.

As can be specifically understood from the above description of R¹, R² and R³, the silicon-containing polyamine in this invention contains at least two units of formula (I) in the molecule.

It is also important that in the silicon-containing polyamine used in this invention not all of, but at leat one of, the units represented by formula (I) forms a unit of the following formula (I)-a.

wherein R¹, R², R³ and n are as defined with regard to formula (I).

In formula (I)-a, it is necessary that the free bond from the silicon atom is directly bonded to another carbon atom (not the carbon atoms in R³ and —CH₂—ₙ) or another oxygen atom (not the indicated oxygen atom) constituting the silicon-containing polyamine molecules, and the free bond from the oxygen atom is directly bonded to another silicon atom (not the indicated silicon atom) constituting the silicon-containing polyamine molecules.

It will be understood from the foregoing description that the silicon-containing polyamine in this invention has a siloxane-type molecular skeleton having at least two units of formula (I) in the molecule and at least one Si—O—Si bond in the molecule and contains a primary or secondary amino group of the following formula

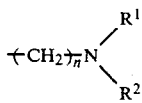

wherein $R^1$, $R^2$ and n are as defined hereinabove, in a state of being directly bonded to the silicon atom forming the skeleton.

Preferably, the silicon-containing polyamine in this invention has a unit of the following formula

 (II)

wherein $R^4$ and $R^5$ are identical or different and each represents a monovalent hydrocarbon group or a fluorocarbon group, in addition to the units of formulae (I) and (I)-a.

Examples of the monovalent hydrocarbon group and fluorocarbon group may be those which have been given hereinabove for $R^3$. The monovalent hydrocarbon group may further be an alkenyl group having 2 to 12 carbon atoms such as vinyl or allyl.

A first group of preferred silicon-containing polyamines in this invention are represented by the following formula

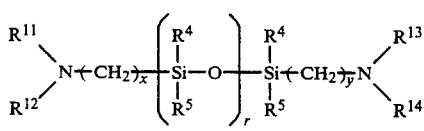 (III)

wherein $R^4$ and $R^5$ are identical or different and each represents a monovalent hydrocarbon group or a fluorocarbon group, $R^{11}$, $R^{12}$, $R^{13}$ and $R^{14}$ are identical or different, and are selected from the groups defined for $R^1$ and $R^2$ above, x and y are identical or different and represent an integer of 1 to 10, and r represents a number of from 1 to 250.

A second group of preferred compounds are represented by the following formula

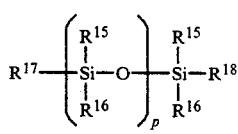 (IV)

wherein $R^{15}$ and $R^{16}$ are identical or different and each represents a monovalent hydrocarbon group, a fluorocarbon group, or a group of the formula

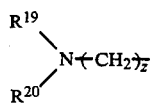 (a)

in which $R^{19}$ and $R^{20}$ are identical or different and are selected from the group defined for $R^1$ and $R^2$ above, and z is an integer of from 1 to 10; $R^{17}$ and $R^{18}$ are identical or different and each represents a hydroxyl group, a monovalent hydrocarbon group, a fluorocarbon group, or a monovalent hydrocarbon-O— group; and p is a number of from 1 to 250; provided that $R^{15}$ and $R^{16}$ bonded to the same silicon atom are not the groups of formula (a) at the same time, and the compound of formula (IV) has at least two primary or secondary amino groups based on formula (a).

The definitions and specific examples of $R^4$, $R^5$, $R^{11}$, $R^{12}$, $R^{13}$ and $R^{14}$ in formula (III) will be evident from the definitions and specific examples of $R^4$, $R^5$, $R^1$ and $R^2$ already given hereinabove. x and y are integers of 1 to 10, preferably 2 to 6, in accordance with the definition of n in formula (I). r is a number of 1 to 250, preferably a number of 2 to 200.

It will be understood that the first group of preferred compounds of formula (III) all have a primary or secondary amino group at their molecular terminals.

In formula (IV), $R^{15}$ and $R^{16}$ are identical or different and each represents a monovalent hydrocarbon group, a fluorocarbon group, or an amino-containing group of the formula (a). Specific examples of these groups will be clear from the specific examples of $R^4$, $R^1$, $R^2$ and n given hereinabove.

$R^{17}$ and $R^{18}$ are identical or different, and each represents a hydroxyl group, a monovalent hydrocarbon group, a fluorocarbon group, or a monovalent hydrocarbon-O-group. Specific examples of the monovalent hydrocarbon group and the fluorocarbon group will be evident from the foregoing description. Alkoxy groups having 1 to 10 carbon atoms and aryloxy groups having 6 to 15 carbon atoms are preferred as the monovalent hydrocarbonoxy group. From the examples of alkyl groups having 1 to 10 carbon atoms and aromatic groups having 6 to 15 carbon atoms given with respect to $R^1$, those skilled in the art will easily understand specific examples of these hydrocarbonoxy groups.

p is a number of 1 to 250, preferably 2 to 200.

It will be understood that the second group of preferred compounds of formula (IV) contain at least two primary or secondary amino groups as pendant groups of the molecules rather than at molecular terminals. The compounds of formula (IV) do not include compounds in which groups of formula (A) containing an amino group are bonded to the same silicon atom, because such compounds are not preferred.

Some examples of the silicon-containing polyamine of formula (III) are as follows:

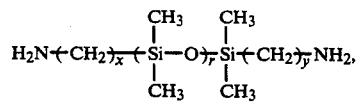 (III)'

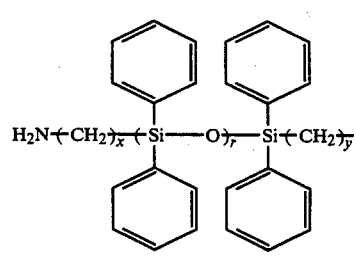 (III)"

and

-continued

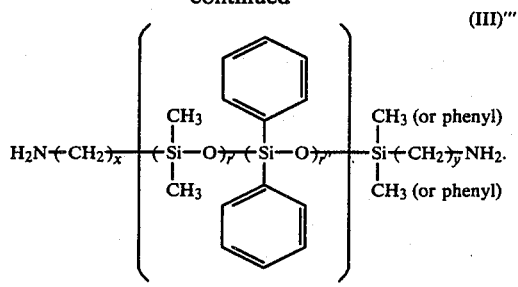
(III)'''

In the above formulae, r' and r" are identical or different and represent zero or a number of 1 to 250, provided that the sum of r' and r" is 1 to 250, and when r' is zero, methyl is bonded to silicon at the right end of formula (III)''', and when r" is zero, phenyl is bonded to silicon at the right end of formula (III)''', and [ ] shows that the dimethylsiloxy groups and the diphenylsiloxy groups are bonded in an arbitrary sequence.

Examples of compounds included in formula (IV) are compounds of the following formula

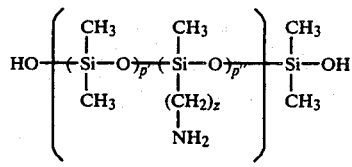
(IV)' wherein p' is zero or a number of 1 to 250, p" is a number of 2 to 250, provided that the sum of p' and p" is a number of 2 to 250, and [ ] shows that the dimethylsiloxy groups and the (aminoalkyl)(methyl)siloxy groups are bonded in an arbitrary sequence.

As is clear from the above exemplification, to cite specific examples would be too troublesome, and it is believed that from some specific examples given above, those skilled in the art will easily understand other examples of the silicon-containing polyamide in this invention. Accordingly, further examples are not given in this specification.

The silicon-containing polyamide in this invention can be produced, for example, by producing dimethylmonochlorosilane [(CH$_3$)$_2$SiHCl)] from monomethyldichlorosilane (CH$_3$SiHCl$_2$) by a Grignard reaction, reacting the product with water to produce bis(dimethylsilyl)ether of the following formula

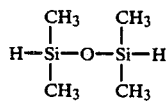

and reacting the product with allylamine (NH$_2$CH$_2$CH=CH$_2$) by hydrosilylation to form a silicon-containing polyamine of the following formula

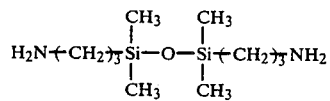
(III)'-a

The resulting silicon-containing polyamine of formula (III)'-a corresponds to a compound of formula (III) in which R$^{11}$, R$^{12}$, R$^{13}$, and R$^{14}$ are all hydrogens, x and y are both 3, R$^4$ and R$^5$ are methyl, and r is 1.

A compound of formula (III) in which r is 2 or more can be produced by reacting the silicon-containing polyamine of formula (III)'-a with cyclic siloxane of the following formula

having 3 to 8 dimethylsiloxy groups bonded cyclically, in the presence of an alkali. Thus, a compound of formula (III) in which x and y are 3 and r is 2 or more can be produced. The reaction product is a mixture of compounds of formula (III) in which r is 2 or more, and can be used directly as the silicon-containing polyamine in this invention. If desired, it may be subjected to fractional distillation to obtain compounds having a low degree of polymerization of about 2 to 6 in pure forms.

The above description is directed to a process for manufacturing the compounds of formula (III)'. It will be easily understood that other compounds included within formula (III), for example compounds of formula (III)" or (III)''', can be produced by using the corresponding reagents in the corresponding reaction steps.

Compounds of formula (IV), for example a compound of formula (IV)' in which z is 3, can be easily produced by polycondensing monoaminopropylmonomethyldimethoxysilane and dimethyldimethoxysilane in the presence of water. Compounds of formula (IV) in which R$^{17}$ and/or R$^{18}$ is a monovalent hydrocarbon group or a fluorocarbon group can be produced by performing the aforesaid polycondensation reaction in the presence of the corresponding monoalkoxysilane such as trimethylmonomethoxysilane, or monotrifluoromethyldimethylmonomethoxysilane.

HYDROCARBON-TYPE POLYAMINE

The hydrocarbon-type polyamine contains at least two primary or secondary amino groups in the molecule.

Preferably, the hydrocarbon-type polyamine is an aliphatic diamine having 2 to 12 carbon atoms, an aliphatic triamine having 4 to 12 carbon atoms, an aliphatic tetramine having 4 to 12 carbon atoms, an alicyclic diamine having 6 to 15 carbon atoms, or an aromatic diamine having 6 to 15 carbon atoms.

Examples of the aliphatic diamine having 2 to 12 carbon atoms are ethylenediamine, tetramethylenediamine, hexamethylenediamine, decamethylenediamine and dodecamethylenediamine.

Examples of the aliphatic triamine having 4 to 12 carbon atoms are compounds of the following formula H$_2$N$+$CH$_2$$)_{\overline{g}}$NH$+$CH$_2$$)_{\overline{g}}$NH$_2$ wherein g is an integer of from 2 to 6. An example is diethylenetriamine.

Examples of the aliphatic tetramine having 4 to 12 carbon atoms are compounds of the following formula

wherein h is an integer of 2 to 4. An example is triethylenetetramine.

Examples of the aliphatic diamine having 6 to 15 carbon atoms include 1,4-diaminocyclohexane, 1,3-diaminocyclohexane, 1,4-bis(aminomethyl)cyclohexane, 1,4-bis(3-aminopropyl)cyclohexane, 4,4'-diaminodicyclohexylmethane, 2,2-(4,4'-diaminodicyclohexyl)propane, and piperazine.

Examples of the aromatic diamine having 6 to 15 carbon atoms include metaphenylenediamine, paraphenylenediamine, 4,4'-diaminodiphenylmethane, 4,4'-diaminodiphenyl ether, 3,4'-diaminodiphenyl ether, and N,N'-dimethylmetaphenylenediamine.

Preferred hydrocarbon-type polyamines are aliphatic diamines having 2 to 12 carbon atoms, alicyclic diamines having 6 to 15 carbon atoms, and aromatic diamines having 6 to 15 carbon atoms.

POLYISOCYANATE COMPOUNDS CONTAINING SILICON

The silicon-containing polyisocyanate compound has at least two isocyanate groups in the molecular chains. It can be produced easily by reacting a hydroxyalkylene-, mercaptoalkylene- or aminoalkylene-terminated silicone with a hydrocarbon-type diisocyanate compound by a method known per se, or reacting an aminoalkylene-terminated silicone with phosgene.

Examples of the silicon-containing polyisocyanate compound are compounds of the following formula

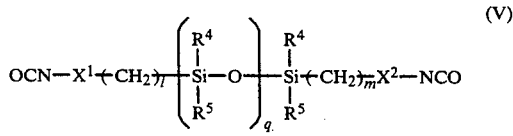 (V)

wherein $R^4$ and $R^5$ are identical or different and each represents a monovalent hydrocarbon group, or a fluorocarbon group, $X^1$ and $X^2$ are identical or different and each represents a single bond or a group of the following formula $$-Y^3-NHCO-Z^3- \quad (b)$$

in which $Y^3$ represents a hydrocarbon group having 1 to 15 carbon atoms, and $Z^3$ represents

—O—, or —S—, $R^8$ being a hydrocarbon group having 1 to 6 carbon atoms, and $Y^3$ in formula (b) is bonded to the isocyanate group (OCN) of formula (V), l and m are identical or different and represent an integer of 1 to 10, and q is a number of 1 to 250.

A compound of formula (V) in which $X^1$ and $X^2$ are group of formula (b) above can be produced by reacting 1 mole of a silicon having hydroxyalkyl, mercaptoalkyl or aminoalkyl [$-(CH_2)_l-A$ and $-(CH_2)_m-A$] at the terminals and represented by the following formula

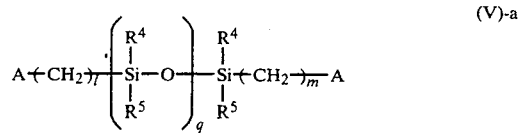 (V)-a wherein A is —OH, —SH or —NHR$^8$, $R^8$ is a hydrogen atom or a hydrocarbon group having 1 to 6 carbon atoms, l and m are identical or different and is an integer of 1 to 10, and q is a number of 1 to 250, with a diisocyanate compound represented by the following formula $$OCN-Y^3-NCO \quad (VI)$$

wherein $Y^3$ is a hydrocarbon group having 1 to 15 carbon atoms, in a manner known per se.

By the above reaction, the terminal groups A of formula (V)-a react with the diisocyanate compound of formula (VI) and are converted to groups of the following formula $$OCN-Y^3-NHCO-Z^3-$$

wherein $Y^3$ is as defined, and $Z^3$ is —O— when A is —OH, —S— when A is —SH, and

when A is —NHR$^8$. Thus, the compound of formula (V) in which $X^1$ and $X^2$ are represented by formula (b) is obtained.

A compound of formula (V) in which $X^1$ and $X^2$ are single bonds can be produced by reacting a compound of formula (V)-a in which A is —NHR$^8$ with phosgene in a manner known per se.

Those starting materials of formula (V)-a in which A is —NHR$^8$ containing part of the silicon-containing polyamines of formula (III). Those starting materials of formula (V)-a in which A is —OH or —SH can be produced by reacting the corresponding bis-silyl compound such as bis(dimethylsilyl)ether with the corresponding hydroxy (or mercapto) compound such as allyl alcohol.

In formula (V), the definitions of $R^4$ and $R^5$ are clear from the foregoing description. $Y^3$ is a hydrocarbon group having 1 to 15 carbon atoms, and will be clarified in detail by the description of the hydrocarbon-type polyisocyanate to be given below. Examples of the hydrocarbon group having 1 to 6 carbon atoms for $R^8$ are alkyl groups such as methyl, ethyl, propyl, butyl, pentyl and hexyl, alicyclic groups such as cyclopentyl and cyclohexyl, and a phenyl group.

l and m are identical or different and represent an integer of 1 to 10, preferably 2 to 6. q is a number of 1 to 250, preferably 2 to 200.

For an easy understanding of the silicon-containing polyisocyanate compound encompassed within formula (V), some examples are given below.

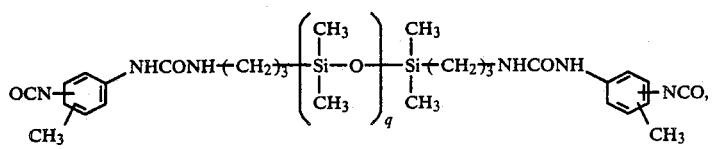

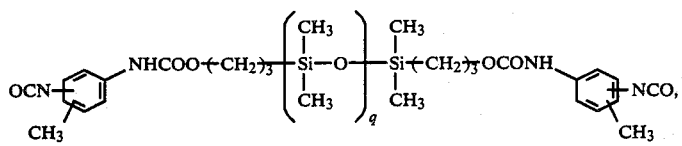

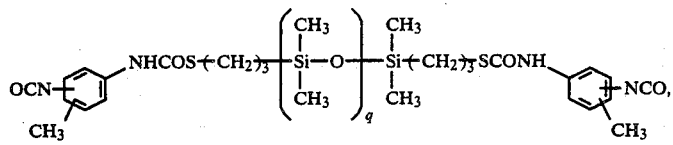

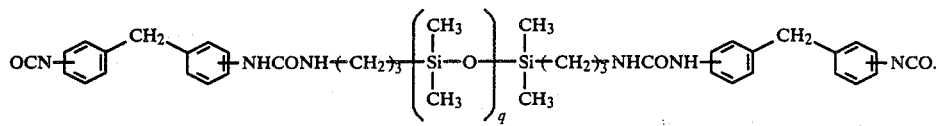

HYDROCARBON-TYPE POLYISOCYANATE

The hydrocarbon-type polyisocyanate has at least two isocyanate groups in the molecular chains.

Preferably, the hydrocarbon-type polyisocyanate is an aliphatic diisocyanate having 3 to 17 carbon atoms, an alicyclic diisocyanate having 8 to 17 carbon atoms, an aralkyl diisocyanate having 9 to 17 carbon atoms, a mono- or dicyclic aromatic diisocyanate having 8 to 17 carbon atoms, or a tricyclic or higher aromatic tri- to dodecaisocyanate having about 23 to about 100 carbon atoms.

The aliphatic diisocyanate having 3 to 17 carbon atoms can be represented by the following formula $$OCN-Y^{31}-NCO \quad (VI)\text{-a}$$

wherein $Y^{31}$ is an alkylene group having 1 to 15 carbon atoms.

Examples of $Y^{31}$ in formula (VI)-a are methylene, ethylene, trimethylene, α-methylethylene, tetramethylene, pentamethylene, α-methyltetramethylene, hexamethylene, heptamethylene, 2,2-dimethylpentamethylene, octamethylene, nonamethylene, decamethylene, undecamethylene, dodecamethylene, tridecamethylene, tetradecamethylene, and pentadecamethylene. Of these, methylene, ethylene, hexamethylene, and 2,2-dimethylpentamethylene are preferred.

Examples of the alicyclic diisocyanate having 8 to 17 carbon atoms are 1,3-diisocyanatocyclohexane, 1,3-diisocyanate-4-methylcyclohexane, bis(4-isocyanatocyclohexyl)methane, 1,1-bis(4-isocyanatocyclohexyl)ethane, 2,2-bis(4-isocyanatocyclohexyl)propane, isophorone diisocyanate and bis(isocyanatemethyl)cyclohexane. Of these, 1,3-diisocyanatocyclohexane, 1,3-diisocyanate-4-methylcyclohexane, bis(4-isocyanatocyclohexyl)methane and isophorone diisocyanate are preferred.

Examples of the aralkyl diisocyanate having 9 to 17 carbon atoms are xylenediisocyanate and bis-(isocyanateethyl)benzene.

Examples of the mono- or diaromatic diisocyanate having 8 to 18 carbon atoms are 1,3-phenylene diisocyanate, 2,4-tolylene diisocyanate, 2,6-tolylene diisocyanate, a 2,4- and 2,6-tolylene diisocyanate mixture, bis-(isicyanatophenyl)methane, and

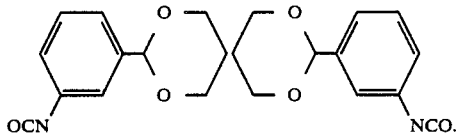

Preferred tri- to dodeca-isocyanates containing at least three rings and about 23 to about 100 carbon atoms are compounds of the following formula

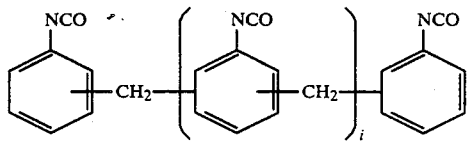

in which i is an integer of 1 to 10.

SILICON-CONTAINING POLYUREA

The silicon-containing polyurea in this invention can be obtained by polyaddition reaction of the silicon-containing polyamine or hydrocarbon-type polyamine and the silicon-containing polyisocyanate or hydrocarbon-type polyisocyanate, in which the use of at least the silicon-containing polyamine or the silicon-containing polyisocyanate is essential.

Specifically, the silicon-containing polyurea in this invention contains at least one of (1) a polyaddition bonded unit derived from the silicon-containing polyamine and the silicon-containing polyisocyanate, (2) a polyaddition bonded unit derived from the hydrocarbon-type polyamine, and the silicon-containing polyisocyanate, and (3) a polyaddition bonded unit derived from the silicon-containing polyamine and the hydrocarbon-type polyisocyanate.

The silicon-containing polyurea in this invention may be composed of any one of the polyaddition bonded units (1) to (3), or of two or three kinds of these polyaddition bonded units (1) to (3).

The silicon-containing polyurea in this invention may contain (4) a polyaddition bonded unit derived from the hydrocarbon-type polyamine and the hydrocarbon-type polyisocyanate if it contains at least one polyaddition bonded unit classified under any one of (1) to (3) above.

From the foregoing, it will be understood that the silicon-containing polyurea in this invention has a unit derived from at least one of the silicon-containing polyamine and the silicon-containing polyisocyanate.

Investigations of the present inventors have shown that when the silicon-containing polyurea is composed of polyaddition bonded units obtained by using only the hydrocarbon-type polyisocyanate as the polyisocyanate component, it cannot give an ultrathin film having good selectivity unless a silicon-containing polyamine having in the molecule at least one unit of formula (I)-a in which the free bond from the silicon atom is bonded to a monovalent hydrocarbon group is used as a starting material. It should be understood therefore that the silicon-containing polyureas in this invention include silicon-containing polyureas which should be excluded when only the hydrocarbon-type polyisocyanate is used as the polyisocyanate component.

Since the unit of formula (I)-a in which the free bond from the silicon atom is bonded to a monovalent hydrocarbon group is expressed by the following formula

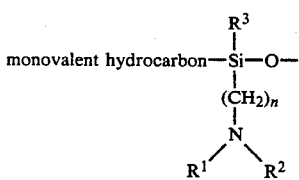

wherein R¹, R², R³ and n are as defined with respect to formula (I)-a, it will be understood that the silicon-containing polyamine having at least one unit of the above formula in the molecule, after all, means a silicon-containing polyamine having the above unit as a terminal group of the molecule, for example the silicon-containing polyamine expressed by formula (III).

The polyaddition bonded units derived from the polyamine and the polyisocyanate in this invention means repeating units containing a urea linkage (—NHCONH—) formed by the polyaddition reaction between the polyamine and the polyisocyanate, as can be understood from the following reaction scheme for one polyaddition bonded unit classified under (3), for example.

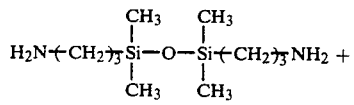

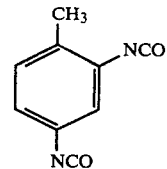

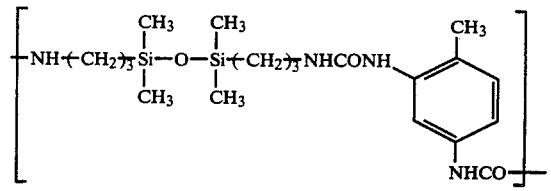

Preferred silicon-containing polyureas in this invention contain the polyaddition bonded units (1) or (3) obtained by using the silicon-containing polyamine as the polyamine component, especially the silicon-containing polyamine of formula (III).

ULTRATHIN FILM COMPOSED OF THE SILICON-CONTAINING POLYUREA

The silicon-containing polyurea in this invention can be produced by a solution method which comprises polyaddition reaction of the polyamine (A) and the polyisocyanate (B) in an aprotic polar solvent. The polyamine and the polyisocyanate are usually employed in such proportions that the ratio of the amino groups of the polyamine to the isocyanate groups of the polyisocyanate is from 1:0.8 to 1:1.2. The aprotic polar solvent should dissolve the resulting silicon-containing polyurea, and is, for example, dimethylformamide, dimethylacetamide, N-methylpyrrolidone or dimethyl sulfoxide. The polyaddition reaction is carried out usually at about 0° to 150° C. for a period of about 30 minutes to about 3 hours.

The resulting solution of the silicon-containing polyurea in the aprotic polar solvent, either as such or after being diluted with a solvent as required, is cast on a smooth solid surface or a liquid surface, and the solvent is volatilized to produce an ultrathin film. Desirably, the polymer solution to be cast contains the silicon-containing polyurea in a concentration of about 1 to about 25% by weight. In the aforesaid film-forming process, it is possible to volatilize a part of the solvent and then dip the film in a solvent, such as water, capable of dissolving the aforesaid solvent. This gives an ultrathin film having an asymmetric structure in accordance with this invention.

The ultrathin film of the silicon-containing polyurea in this invention may be advantageously produced by a method which comprises interfacial polyaddition reaction of the polyamine (A) and the polyisocyanate (B) on a microporous supporting film. According to this method, the ultrathin film of this invention can be obtained usually in the form of a composite structure integrated with the microporous support.

The interfacial polyaddition reaction on the microporous supporting film may be carried out in accordance with two embodiments. A first embodiment is a method which comprises dissolving the polyamine and the polyisocyanate is solvents immiscible with each other to prepare a solvent solution of the polyamine and a solvent solution of the polyisocyanate, applying one of the solvent solutions on a microporous supporting film, then applying the other solvent solution on it, and effecting polyaddition reaction on the interface between the two solvent solutions. A second embodiment is a method which comprises applying a solvent solution of the polyamine to the microporous support film, then applying the polyisocyanate in the form of a vapor in an inert gas, and effecting polyaddition reaction on the interface between the solution and the vapor phase.

Examples of the microporous supporting film which can be used in this invention include inorganic porous films such as a vitreous porous film, a sintered metal film and a ceramic film, and organic porous films such as films made from cellulose esters, polystyrene, polyvinyl butyral, polysulfone, polyvinylidene fluoride and polyvinyl chloride. Porous films of polysulfone or polyvinylidene fluoride are preferred.

Porous polysulfone films are described in OSW Report No. 359. Methods for producing these porous films in the form of a flat membrane are known, and some of such films are commercially available. In the present invention, these porous films can also be used while being supported on a reinforcing substrate such as a woven or nonwoven fabric of a polyester, polypropylene, etc. A reinforced porous film of this kind can be obtained by applying a solution of a polymer such as polysulfone to the reinforcing substrate, and then converting the solution into a porous film on the reinforcing substrate, as described in Referential Examples given hereinbelow.

According to this invention, the porous films include those in the form of a hollow fiber. Porous films in the form of a hollow fiber are organic porous films, and can be produced, for example, by dissolving a polymer such as polysulfone in a water-miscible mixture, for example a mixture of lithium chloride, 2-alkoxyethanol and N-methylpyrrolidone to prepare a dope, spinning the dope into water by a known spinning device equipped with circular orifices while passing water as a coagulating liquid (core liquid) through the inside of each circular orifice, thus coagulating the filaments and winding them up. Hollow fibers having various pore properties can be produced by selecting the concentration or temperature of the polymer in the dope, the spinning speed, etc.

The microporous supporting film used in this invention have on its surface pores usually having a size of about 10 to about 5000 Å, preferably about 30 to about 1000 Å. Desirably, this microporous supporting film does not have pores having a pore diameter of more than 1 micron, and preferably it does not have pores having a pore diameter exceeding 0.5 microns. The microporous supporting film may be of a symmetric or asymmetric structure, the latter being preferred. According to another standard, the microporous supporting film has an air permeability, measured by the device shown in JIS P-8117, of 20 to 3000 seconds, preferably 50 to 1000 seconds.

In the first embodiment, the polyamine and the polyisocyanate are dissolved respectively in different solvents not substantially miscible with each other and prepared as solutions. These solvents should not substantially dissolve the resulting silicon-containing polyurea.

Examples of preferred solvents for the polyisocyanate include aliphatic hydrocarbons having 6 to 20 carbon atoms such as n-hexane, n-octane, n-decane, 1-decene, 1-tetradecene, 1-hexadecene, cyclohexane, cyclohexene, and 2,2,4-trimethylhexane; aromatic hydrocarbons having 6 to 12, such as benzene, toluene, xylene, ethylbenzene and mixed xylene; halogenated hydrocarbons having 1 to 12 carbon atoms such as tetrachloromethane, chloroform, dichloroethane, trichloroethane, trichloroethylene, trichlorotrifluoroethane, chlorobenzene, dichlorobenzene, fluorobenzene, and hexafluorobenzene; ethers having 4 to 14 carbon atoms such as dipropyl ether, dibutyl ether, dipentyl ether, dibenzyl ether, and anisole; ketones having 3 to 14 carbon atoms such as 2-butanone, cyclohexanone, 4-methyl-2-pentanone, and acetophenone; esters having 3 to 14 carbon atoms such as methyl formate, propyl formate, butyl formate, vinyl acetate, ethyl acetate, butyl acetate, benzyl acetate and ethyl butyrate; and mixtures of two or more of these.

Examples of preferred solvents for the polyamine include water; alcohols having 1 to 10 carbon atoms, preferably 1 to 6 carbon atoms, such as methanol, ethanol, isopropanol and 2-methoxyethanol; glycols having 1 to 6 carbon atoms such as ethylene glycol, diethylene glycol, triethylene glycol, and propylene glycol; ethers having 1 to 6 carbon atoms such as dioxane; esters having 1 to 6 carbon atoms such as methyl formate, propyl formate, ethyl acetate and butyl acetate; and mixtures of two or more of these.

The solvent solution of the polyamine is prepared so as to contain the polyamine usually in a concentration of 0.1 to 5% by weight. The solvent solution of the polyisocyanate is prepared so as to contain the polyisocyanate usually in a concentration of 0.05 to 5.0% by weight, preferably 0.1 to 3.0% by weight.

The sequence of application of the solvent solution of the polyamine and the solvent solution of the polyisocyanate is not limited, but preferably the solvent solution of the polyamine is first applied.

When the porous supporting film is a flat membrane, the solution to be first applied is applied to the porous supporting film by a dipping method comprising dipping the supporting film in the solution, or a coating method comprising coating the solution on the supporting film. When the porous supporting film is in the form of a hollow fiber, the solvent solution can be applied to its outside by the dipping method mentioned above, and to its inside (inside wall of the hollow fiber) by sending the solution into the hollow portion by a pump or sucking the solution into the inside of the hollow fiber (the solution pumping or sucking method). As required, the excess of the solution first applied to the porous supporting film is drained, or purged under pressure. The porous supporting film is, as required, dried to remove a part of the solvent. The first solution is applied to the porous supporting film to a thickness of preferably about 0.01 to 2 microns, more preferably about 0.02 to 2 microns, especially preferably about 0.05 to about 0.7 micron.

The next solution is applied to the film of the solution first applied, whereby the polyamine and the polyisocyanate perform polyaddition reaction on the interface between the two solutions. The second solution can be applied in the same way as in the application of the first solution, but it is not necessary to take any particular care about the thickness of the second solution to be applied. Since the polyaddition reaction proceeds on the interface between the two solutions, and substantially ends when the polyamine or polyisocyanate first applied is substantially consumed. The excess of the second solution can thus be removed after the polyaddition reaction is substantially terminated.

The polyaddition reaction can be carried out at about 0° to about 100° C., preferably 20° to 50° C., for a period of, for example, 2 seconds to 30 minutes, preferably 10 seconds to 5 minutes.

The polyaddition reaction described above can be repeatedly carried out on the silicon-containing polyurea film formed on the porous supporting film, and though the thickness of the silicon-containing polyurea film is increased, its selectivity can be improved.

After the polyaddition reaction is over, the product may be dried, washed, dried and then washed, or dried after washing it as required.

The second embodiment of the interfacial polyaddition reaction on the microporous supporting film is started by first applying the solvent solution of the polyamine to the porous supporting film in quite the same way as in the first embodiment.

Then, the polyisocyanate in the form of a vapor in an inert gas is applied to the layer of the polyamine solution. Air, nitrogen, argon, neon, organic Furon gas, etc. can be used as the inert gas. The partial pressure of the polyisocyanate in the inert gas is preferably at least 0.1 mmHg, especially preferably at least 0.2 mmHg. When the polyisocyanate has a low vapor pressure, it is necessary to increase the vapor pressure by elevating the temperature. If the temperature is raised too much, the polyamine or a solvent for it is liable to evaporate. The suitable temperature for the contact reaction is not more than 150° C., preferably not more than 95° C., especially preferably not more than 70° C. The polyisocyanate in the inert gas and the polyamine in the solution layer are kept in contact with each other for a period of usually 0.1 second to 2 hours, preferably 1 second to 30 minutes, although the contacting time may vary depending upon the kinds of these compounds, the contacting temperature, etc.

In the second embodiment, too, the polyaddition reaction can be repeated as above on the silicon-containing polyurea film so formed on the porous supporting film.

After the polyaddition reaction, the product may be dried, or washed and dried.

The ultrathin film of this invention composed of the silicon-containing polyurea is provided preferably in a thickness ranging from about 0.01 to about 1 micron, especially preferably from about 0.03 to about 0.5 micron.

Furthermore, according to this invention, the ultrathin film gives a composite structure, for example in the form of a flat membrane or hollow fiber, supported on a microporous supporting film.

The ultrathin film composed of the silicon-containing polyurea of this invention can be used to obtain a gaseous mixture containing a certain specified gas in an increased concentration from a gaseous mixture containing at least two gases including the above-specified gas. Since the ultrathin film of this invention is composed of the silicon-containing polyurea of the above-specified composition, it has an oxygen permeation coefficient 2 to 6 times as high as its nitrogen permeation constant, and therefore can be conveniently used to produce from air a gaseous mixture having an oxygen concentration higher than in the air. Thus, it can be used to produce a gaseous mixture containing a specified gas in an increased concentration from a gaseous mixture of at least two gases; for example, it can be conveniently used to produce from air a gaseous mixture having a higher oxygen concentration than in the air. Furthermore, since the ultrathin film of this invention, in spite of its very small thickness, does not substantially contain such large pores as to permit passage of a gaseous mixture itself, it can produce at a very high speed a gaseous mixture containing a specified gas in an increased concentration.

Preferably, for production of such a gaseous mixture, the ultrathin film of this invention is used in the form of a composite structure supported on a microporous supporting film. Such a composite structure can be used by building it into a module, or more specifically as an oxygen enricher, as disclosed, for example, in U.S. patent application Ser. No. 217,582 and European Laid-Open Patent Application No. 0031725.

Since the ultrathin film of this invention can produce oxygen-enriched air from air, it is useful in increasing the burning efficiency of engines or heating appliances, or for nursing immature infants or treating patients with respiratory diseases, or as artificial lungs or artificial gills.

Not only is the ultrathin film of this invention suitable for producing oxygen-enriched air from air, but also it is conveniently used for separating carbon dioxide from a gaseous mixture (for example, combustion gas) composed mainly of carbon dioxide and nitrogen, separating helium or argon from a gaseous mixture (e.g., a gaseous mixture of air and helium or argon resulting from gasification of liquefied helium or argon) composed mainly of nitrogen gas and helium or argon, separating helium from natural gas, or separating hydrogen from a gaseous mixture (such as aqueous gas) composed mainly of hydrogen, carbon monoxide and methane.

The following examples illustrate the present invention in greater detail. It should be understood that the invention is in no way limited by these examples.

The gas permeating properties of the ultrathin film of this invention and the composite structures having the ultrathin films were evaluated as follows:

The gas permeating properties of a composite structure in the form of a flat membrane were measured at 25° C. by using a "Seikaken-type" gas permeability measuring device made by Rika Seiki Kogyo Co., Ltd.

The gas permeating properties of a composite structure in the form of a hollow fiber were measured as follows: A hollow fiber membrane module is incorporated into a gas permeability measuring device may be Yanagimoto Seisakusho Co., Ltd. A sample gas (e.g., oxygen gas) and a carrier gas (e.g., helium) are passed at 25° C. through the surface side (supporting the silicon-containing polyurea) and back side of the hollow fiber membrane respectively. The concentration of the sample gas permeated into the carried gas which has flowed away is measured by a thermoconductivity detector. Thus, the gas permeation properties of the hollow fiber membrane are measured.

All parts in these examples are by weight.

REFERENTIAL EXAMPLE 1

Production of a flat microporous supporting film of polysulfone reinforced with a nonwoven fabric:

A dense Dacron nonwoven fabric (basis weight 180 g/m$^2$) was fixed onto a glass plate. A solution containing 12.5% by weight polysulfone (Udel PS3500, a trademark for a product of Union Carbide Corporation), 12.5% by weight of methyl Cellosolve and the remainder being dimethylformamide was cast in a layer having a thickness of about 0.2 mm on the nonwoven fabric, and immediately dipped in a water bath at room temperature to gel the polysulfone layer. A flat microporous supporting film of polysulfone reinforced with the nonwoven fabric was thus obtained.

Observation of an electron microphotograph of the resulting microporous supporting film showed that the microporous polysulfone layer had a thickness of about 40 to about 70 microns and of an asymmetrical structure, and many micropores having a size of about 50 to about 600 Å existed on the surface of the polysulfone layer. This microporous supporting film of polysulfone had an air permeability, determined by the device stipulated in JIS P-8117, of 150 to 300 seconds.

REFERENTIAL EXAMPLE 2

Production of a microporous supporting film of polysulfone in the form of a hollow fiber:

A solution at 25° C. consisting of 20 parts of polysulfone (Udel PS3500, trademark), 70 parts of dimethylformamide and 10 parts of methyl Cellosolve was extruded through a circular slit using water as a core liquid. The resulting fine stream was dipped in water at 25° C. to coagulate it. Thus, a microporous supporting film of polysulfone in the form of a hollow fiber having an outside diameter of 450 μm and an inside diameter of 290 μm was obtained.

Then such microporous supporting films in the form of a hollow fiber were inserted in a polycarbonate pipe (having an inside diameter of 10 mm and a length of 320 mm and having holes with a diameter of about 5 mm at opposite end portions of the pipe wall at points each spaced from each pipe end by about 2 cm) in such a manner that the microporous supporting films portruded from both ends of the pipe. An adhesive was filled into both end portions of the pipe and the supporting films were fixed nearly parallel within the pipe. Thereafter, about 1 cm of each end was cut off to produce a hollow fiber module having a length of about 300 mm.

This module had an air permeating speed of $5 \times 10^{-3}$ (cc (STP)/cm$^2$.sec.cmHg) at 25° C.

REFERENTIAL EXAMPLE 3

Production of a microporous supporting film of polysulfone in the form of a hollow fiber:

Six hundred parts of polysulfone (Udel PS3500), 90 parts of lithium chloride and 600 parts of 2-methoxyethanol were dissolved in 1710 parts of N-methyl-2-pyrrolidone to give a clear solution. The solution was extruded through a circular slit having an outside diameter of 1.0 mm and an inside diameter of 0.6 mm with a core liquid extrusion opening having a diameter of 0.3 mm by using water as the core liquid. The extrudate was allowed to run 2 cm in air, dipped in water at 25° C. to coagulate it, and wound up at a speed of 6 meters/min. The resulting microporous supporting film of polysulfone had an outside diameter of 800 microns and an inside diameter of about 500 microns.

Using the resulting supporting films, a hollow fiber film module was produced in the same way as in Referential Example 2. The module has an air permeating speed at 25° C. of $6 \times 10^{-3}$ cc (STP)/cm$^2$.sec.cmHg.

EXAMPLE 1

(1) Production of bis(3-aminopropyl)tetramethyldisiloxane:

A reaction vessel was charged with 27 parts of bis(-dimethylsilyl)ether (a product of Shinetsu-Silicone Co., Ltd.), 34 parts of allylamine, 100 parts of hexane and 0.01 part of H$_2$PtCl$_2$.6H$_2$O as a catalyst. They were reacted under reflux at a reaction temperature of about 60° C. for 10 hours. After the reaction, the unreacted materials and the solvent were evaporated off, and the residue was distilled to give 15 parts of bis(3-aminopropyl)tetramethyldisiloxane having a boiling point of 138° to 140° C. at 12 mmHg. This product had the following formula.

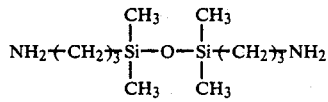

(2) One part of bis(3-aminopropyl)tetramethyldisiloxane obtained in (1) above was dissolved in 49.5 parts of ethanol, and 49.5 parts of water was added. The mixture was stirred. The flat microporous supporting film of polysulfone obtained in Referential Example 1 was dipped in the resulting solution for 5 minutes, withdrawn from the solution and then placed vertically at room temperature to drain the solution for 10 minutes.

The film was then dipped for 3 minutes in a 1.0% by weight n-hexane solution of 4,4'-diphenylmethane diisocyanate, and then air-dried at room temperature for 60 minutes. The gas permeating speed of the resulting composite structure composed of the microporous supporting film and the polymeric film were measured at 25° C. by using a "Seikaken-type" gas permeability measuring device, and the selectivity was calculated. The results are shown in Table 1.

EXAMPLES 2 TO 4

Three composite structures were produced in the same way as in Example 1, (2) except that each of the polyamine compounds and the polyisocyanate compounds shown in Table 1 were used. The gas permeating speeds and selectivities of the composite structures are summarized in Table 1.

$Q_{O2}$ and $Q_{N2}$ in Table 1 and subsequent Tables represent the premeating speed of oxygen and the permeating speed of nitrogen, respectively.

TABLE 1

| Example | Polyamine | Polyisocyanate | Gas permeating speed Q × 10$^5$ $\left( \dfrac{cc(STP)}{cm^2 \cdot sec \cdot cmHg} \right)$ | | Selectivity |
| | | | $Q_{O2}$ | $Q_{N2}$ | $Q_{O2}/Q_{N2}$ |
| --- | --- | --- | --- | --- | --- |
| 1 | bis(3-Aminopropyl)-tetramethyldisiloxane | 4,4'-diphenylmethane diisocyanate (to be referred to as MDI) | 1.12 | 0.215 | 5.25 |

TABLE 1-continued

| Example | Polyamine | Polyisocyanate | Gas permeating speed Q × 10⁵ $\left(\dfrac{cc(STP)}{cm^2 \cdot sec \cdot cmHg}\right)$ | | Selectivity $Q_{O2}/Q_{N2}$ |
|---|---|---|---|---|---|
| | | | $Q_{O2}$ | $Q_{N2}$ | |
| 2 | bis(3-Aminopropyl)-tetramethyldisiloxane | 2,4-Tolylene diisocyanate (to be referred to as TDI) | 1.02 | 0.191 | 5.33 |
| 3 | bis(3-Aminopropyl)-octamethyltetrasiloxane (*1) | 2,4-Tolylene diisocyanate (to be referred to as TDI) | 2.72 | 0.65 | 4.2 |
| 4 | bis(3-Aminopropyl)-tetramethyldisiloxane (0.9 part) + hexamethylenediamine (0.1 part) | 2,4-Tolylene diisocyanate (to be referred to as TDI) | 0.97 | 0.206 | 4.72 |

(*1) Used as a solution prepared by dissolving 1.0 part of this polyamine in 70 parts of ethanol, and adding 30 parts of water.

EXAMPLE 5

(1) Production of bis(3-isocyanatopropyl)tetramethyldisiloxane:

Twenty parts of bis(3-aminopropyl)tetramethyldisiloxane obtained in Example 1, (1) was dissolved in 400 parts of butyl acetate. Thirty parts of butyl acetate was put in a flask equipped with a stirrer, a dropping funnel, a reflux condenser, a thermometer and a phosgene introducing tube, and cooled to 10° C. with an ice bath. Phosgene passed through the flask, and the polyamine solution prepared as above was added dropwise from the dropping funnel over the course of 30 minutes. After the addition, phosgene was further passed through the flask for 30 minutes to continue the reaction between the polyamine and phosgene. The ice bath was then replaced by an oil bath, and the reaction mixture was heated to 110° C. The reaction was continued by passing phosgene for 1 hour. After the reaction, dry nitrogen was passed through the flask at 110° C. to remove dissolved gases. The unreacted materials and the solvent were evaporated off, and the residue was distilled under reduced pressure to give 4 parts of bis(3-isocyanatopropyl)tetramethyldisiloxane of the following formula having a boiling point of 131° C. at 2 mmHg.

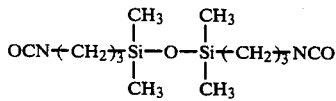

(2) One part of the bis(3-aminopropyl)tetramethyldisiloxane obtained in Example 1, (1) was dissolved in 30 parts of ethanol, and 70 parts of water was further added. The mixture was stirred to obtain a uniform solution. The flat microporous supporting film of polysulfone obtained in Referential Example 1, after thorough washing with water, was dipped in the resulting solution for 6 minutes. The polysulfone film was then withdrawn from the solution, and dried in a dry box at 23° C. and 65% RH for 10 minutes while being placed vertically. The film was then dipped for 9 minutes in a 1.0% by weight n-hexane solution of bis(3-isocyanatopropyl)tetramethyldisiloxane obtained in (1) above to form a polymer film on the microporous supporting film of polysulfone, and the film was dried at room temperature for 60 minutes.

The gas permeating properties of the resulting composite structure were measured, and the results are shown in Table 2.

TABLE 2

| Gas | Gas permeating speed Q × 10⁵ [cc (STP)/ cm² · sec · cmHg] | Selectivity (Q/$Q_{N2}$) |
|---|---|---|
| Carbon dioxide | 23 | 16.4 |
| Oxygen | 8 | 5.7 |
| Argon | 4.6 | 3.3 |
| Nitrogen | 1.4 | 1.0 |

In Table 2, Q represents the permeating speed of each gas.

EXAMPLES 6 TO 8 AND COMPARATIVE EXAMPLES 1 TO 3

In each run, a composite structure was produced in the same way as in Example 5, (2) except that each of the polyamine compounds and each of the polyisocyanate compounds indicated in Table 3 were used. In Example 6, the polyamine was used as a solution prepared by dissolving 1 part of the polyamine compound in 70 parts of ethanol and adding 29 parts of water. In Example 7 and Comparative Example 1, the polyamine compound was used as a solution obtained by dissolving 1 part of the polyamine compound in 100 parts of water. In Example 7 and Comparative Example 1, the polysulfone support was dried for 15 minutes after withdrawing from the polyamine solution. In Comparative Example 1, dipping in the polyisocyanate solution was performed for 5 minutes.

The gas permeating properties of the six composite structures obtained are shown in Table 3.

TABLE 3

| Run No. | Polyamine | Polyisocyanate | Gas permeating speed Q × 10⁵ $\left(\dfrac{cc(STP)}{cm^2 \cdot sec \cdot cmHg}\right)$ | | Selectivity $Q_{O2}/Q_{N2}$ |
|---|---|---|---|---|---|
| | | | $Q_{O2}$ | $Q_{N2}$ | |
| Example 6 | bis(3-Aminopropyl)- | bis(3-isocyanatopropyl)- | 8.9 | 2.1 | 4.3 |

TABLE 3-continued

| Run No. | Polyamine | Polyisocyanate | Gas permeating speed Q × 10⁵ ($\frac{cc(STP)}{cm^2 \cdot sec \cdot cmHg}$) $Q_{O2}$ | $Q_{N2}$ | Selectivity $Q_{O2}/Q_{N2}$ |
|---|---|---|---|---|---|
| | octamethyltetrasiloxane | tetramethyldisiloxane | | | |
| Example 7 | 2,2,2-Trimethyl-hexamethylenediamine | bis(3-isocyanatopropyl)-octamethyltetrasiloxane | 6.9 | 1.4 | 4.8 |
| Example 8 | bis(3-Aminopropyl)-octamethyltetrasiloxane | bis(3-isocyanatopropyl)tetramethyldisiloxane and isophorone diisocyanate in a mole ratio of 2:1 | 3.5 | 1.9 | 3.4 |
| Comparative Example 1 | 1,1-Diaminodecane | MDI | 0.12 | 0.039 | 3.1 |
| Comparative Example 2 | Hexamethylenediamine | MDI | 0.22 | 0.076 | 2.9 |
| Comparative Example 3 | Ethylenediamine | TDI | 0.11 | 0.033 | 3.3 |

EXAMPLE 9

A 1% by weight solution (1:1 ethanol/water mixture) of the bis(3-aminopropyl)tetramethyldisiloxane obtained in Example 1, (1) was coated on the inside of the module obtained in Referential Example 2, and nitrogen gas was blown against the coated surface to remove the residual solution. Then, a 1% by weight n-hexane solution of a diisocyanate mixture composed of 80% by weight of bis(3-isocyanatopropyl)tetramethyldisiloxane and 20% by weight of 4,4'-diphenylmethane diisocyanate was coated on the inside of the module to form a polymer film on the inside of the hollow fiber module.

The gas permeating properties of the resulting composite structure in the form of a hollow fiber were measured at 25° C. by a gas permeability measuring device including a gas-chromatographic detector.

The composite structure had an oxygen permeating speed ($Q_{O2}$) of $4.6 \times 10^{-5}$ (cc/cm²·sec·cmHg), and a selectivity ($Q_{O2}/Q_{N2}$) of 4.5.

EXAMPLE 10

The hollow fiber module obtained in Referential Example 2 was sealed up at both ends so as not to permit passage of solution into the cavity. The module was then dipped for 5 minutes in the same diamine solution as used in Example 1, (2) to coat it on the outside of the hollow fibers. Nitrogen gas was blown so as to remove the residual solution on the surfaces of the fibers. The module was then dipped for 3 minutes in the same diisocyanate solution as used in Example 9 to form a polymer film on the outside of the hollow fibers. The gas permeating properties of the resulting composite structure were measured in the same way as in Example 9. It was found that the oxygen permeating speed ($Q_{O2}$) was $5.4 \times 10^{-5}$ (cc/cm²·sec·cmHg), and the selectivity was 4.1.

EXAMPLES 11 TO 14

Fifteen parts of a silicone-containing polyamine compound of the following formula produced from bis(3-aminopropyl)tetramethyldisiloxane and cyclic polydimethylsiloxane was dissolved in 150 parts of toluene.

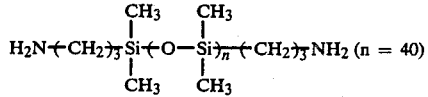

The resulting solution was added dropwise to a separately prepared solution of 18 parts of 2,4-tolylene diisocyanate in 110 parts of toluene at 0° C. in an atmosphere of nitrogen with stirring. After the addition, the mixture was further stirred for 30 minutes. The solution was transferred to a vacuum distillation device, and toluene and the excess of 2,4-tolylene diisocyanate were evaporated. Furthermore, at a pressure of 0.5 mmHg and a temperature of 150° C., the distillation was carried out for 2 hours to remove the unreacted 2,4-tolylene diisocyanate. A liquid reaction product was obtained.

The flat microporous supporting film of polysulfone obtained in Referential Example 1 was dipped for 5 minutes in a 1.0% by weight aqueous solution of each of the polyamine compounds shown in Table 4. The film was withdrawn from the aqueous solution, and placed vertically at room temperature for 10 minutes to drain the solution. The film was then dipped for 3 minutes in a 1.0% by weight n-hexane solution of the aforesaid reaction product, and dried at room temperature for 60 minutes to form a polymer film. The gas permeating speeds of the resulting composite structure were measured and the results are shown in Table 4.

TABLE 4

| Example | Polyamine | Gas permeating speeds Q × 10⁵ [cc (STP)/cm²·sec·cmHg] $Q_{O2}$ | $Q_{N2}$ | Selectivity $Q_{O2}/Q_{N2}$ |
|---|---|---|---|---|
| 11 | Ethylenediamine | 15.8 | 5.4 | 2.9 |
| 12 | Diethylenetriamine | 6.2 | 1.4 | 4.3 |
| 13 | Triethylenetetramine | 2.5 | 0.54 | 4.6 |
| 14 | bis(aminopropyl)-tetramethyl-disiloxane*¹ | 5.8 | 1.2 | 4.7 |

*¹: Used as a solution in a mixture composed of 30% by weight of water and 70% by weight of ethanol.

EXAMPLES 15 TO 21

In each run, a liquid polyisocyanate compound was produced from the amine, alcohol or thioalcohol component (15 parts) and the isocyanate component (the amount indicated in Table 5) in the same way as in Example 11. The flat microporous supporting film of polysulfone obtained in Referential Example 1 was dipped for 5 minutes in a 1.0% by weight aqueous solution of each of the polyamine compounds shown in Table 5, and then in the same way as in Example 11, dipped for 3 minutes in an n-hexane solution of the liquid polyisocyanate compound, and dried in the air at room temperature for 60 minutes. The gas permeating properties of the resulting composite films are shown in Table 5.

and 40 parts of water were reacted for 6 hours at 70° C. in a stream of nitrogen with stirring. The pressure of the reaction system was then reduced to below 1 mmHg, and the reaction was carried out at 75° C. for 6 hours to obtain an amino-modified siloxane oil (silicon-containing polyamine).

Three parts of the amino-modified siloxane was dissolved in 97 parts of water, and the flat microporous supporting film of polysulfone obtained in Referential Example 1 was dipped for 5 minutes in the resulting solution. Then, the film was withdrawn from the solution, and placed vertically at room temperature for 10 minutes to drain the solution.

The film was then dipped for 5 minutes in a 1% by weight n-hexane solution of each of the polyisocyanate compounds indicated in Table 6, and then dried at room

TABLE 5

| Example | Polyamine compound | Polyisocyanate compound Amine, alcohol or thioalcohol component | Isocyanate component (parts by weight) | Gas permeating speed, $Q \times 10^5$ $\left(\frac{cc(STP)}{cm^2 \cdot sec \cdot cmHg}\right)$ $Q_{O_2}$ | $Q_{N_2}$ | Selectivity $Q_{O_2}/Q_{N_2}$ |
|---|---|---|---|---|---|---|
| 15 | bis(aminopropyl)tetramethyldisiloxane | $H_2N(CH_2)_3Si(OSi)_n(CH_2)_3NH_2$ with $CH_3$ groups (n = 40) | bis(isocyanatomethyl)-cyclohexane (50) | 13 | 4.2 | 3.1 |
| 16 | Ethylenediamine | $H_2N(CH_2)_3Si(OSi)_n(CH_2)_3NH_2$ with $CH_3$ groups (n = 100) | 2,4-Tolylene diisocyanate (*1) (35) | 13.2 | 4.6 | 2.9 |
| 17 | Trimethylhexamethylenediamine | $H_2N(CH_2)_3Si(OSi)_n(CH_2)_3NH_2$ with $CH_3$ groups (n = 100) | 2,4-Tolylene diisocyanate (*1) (35) | 10.4 | 3.5 | 3.0 |
| 18 | bis(aminopropyl)-tetramethyldisiloxane | $H_2N(CH_2)_3Si(OSi)_n(CH_2)_3NH_2$ with $CH_3$ groups (n = 100) | 2,4-Tolylene diisocyanate (*1) (35) | 6.8 | 1.5 | 4.4 |
| 19 | bis(aminopropyl)tetramethyldisiloxane | $HO(CH_2)_3Si(O-Si)_n(CH_2)_3OH$ with $CH_3$ groups (n = 40) | 2,4-Tolylene diisocyanate (18) | 5.1 | 1.1 | 4.6 |
| 20 | bis(aminopropyl)tetramethyldisiloxane | $HO(CH_2)_3Si(O-Si)_n(CH_2)_3OH$ with $CH_3$ groups (*2) (n = 3) | 2,4-Tolylene diisocyanate (*3) (90) | 4.6 | 1.0 | 4.5 |
| 21 | bis(aminopropyl)tetramethyldisiloxane | $SH(CH_2)_3Si(O-Si)_n(CH_2)_3HS$ with $CH_3$ groups (n = 40) | 2,4-Tolylene diisocyanate (18) | 4.9 | 1.1 | 4.5 |

(*1): Dissolved in 165 parts of toluene;
(*2): Dissolved in 135 parts of dimethylformamide;
(*3): Dissolved in 320 parts of dimethylformamide

EXAMPLES 22 TO 24 AND COMPARATIVE EXAMPLES 4 AND 5

20.6 Parts of N-(2-aminoethyl)-3-aminopropyldimethoxymethylsilane, 14.8 parts of dimethyldiethoxysilane temperature for 60 minutes. The gas permeating properties of the resulting composite film are shown in Table 6.

The polyisocyanate compounds used in Examples 22 to 24 were prepared in the same way as in Example 16.

of ethanol, and the porous polysulfone film obtained in Referential Example 1 was dipped for 5 minutes in this solution. It was then withdrawn from the solution, and

TABLE 6

| Run No. | Polyisocyanate compound | Gas permeating speed Q × 10$^5$ $\left(\dfrac{cc(STP)}{cm^2 \cdot sec \cdot cmHg}\right)$ | | Selectivity $Q_{O2}/Q_{N2}$ |
|---|---|---|---|---|
| | | $Q_{O2}$ | $Q_{N2}$ | |
| Example 22 | OCN—⌬(CH$_3$)—NHCN—(CH$_2$)$_3$Si(CH$_3$)$_2$—(OSi(CH$_3$)$_2$)$_n$—(CH$_2$)$_3$NHCN—⌬(CH$_3$)—NCO (n = 20) | 0.60 | 0.12 | 5.0 |
| Example 23 | OCN—⌬(CH$_3$)—NHCN—(CH$_2$)$_3$Si(CH$_3$)$_2$—(OSi(CH$_3$)$_2$)$_n$—(CH$_2$)$_3$NHCN—⌬(CH$_3$)—NCO (n = 30) | 0.88 | 0.22 | 3.9 |
| Example 24 | OCN—⌬(CH$_3$)—NHCN—(CH$_2$)$_3$Si(CH$_3$)$_2$—(OSi(CH$_3$)$_2$)$_n$—(CH$_2$)$_3$NHCN—⌬(CH$_3$)—NCO (n = 100) | 1.0 | 0.27 | 3.7 |
| Comparative Example 4 | TDI | 1.14 | 0.92 | 1.2 |
| Comparative Example 5 | MDI | 0.32 | 0.18 | 1.8 |

EXAMPLES 25 AND 26 AND COMPARATIVE EXAMPLE 6

19 Parts of 3-aminopropyldiethoxymethylsilane, 15 parts of dimethyldiethoxysilane and 40 parts of water were reacted in a stream of nitrogen at 70° C. for 6 hours with stirring. Then, the inside of the reaction system was maintained at a vacuum of below 1 mmHg, and the reaction was continued at 75° C. for 7 hours to obtain an amino-modified siloxane oil.

Four parts of the amino-modified siloxane oil was dissolved in a mixture of 48 parts of water and 48 parts placed vertically at room temperature for 5 minutes to drain the solution.

The film was then dipped for 5 minutes in a 1% by weight n-hexane solution of each of the polyisocyanate compounds shown in Table 7, and then dried at room temperature for 60 minutes.

The properties of the resulting film were measured at 25° C. The results are shown in Table 7.

TABLE 7

| Run No. | Polyisocyanate compound | Gas permeating speed, Q × 10$^5$ $\left(\dfrac{cc(STP)}{cm^2 \cdot sec \cdot cmHg}\right)$ | | Selectivity $Q_{O2}/Q_{N2}$ |
|---|---|---|---|---|
| | | $Q_{O2}$ | $Q_{N2}$ | |
| Example 25 | OCN—⌬(CH$_3$)—NHCN—(CH$_2$)$_3$Si(CH$_3$)$_2$—(O—Si(CH$_3$)$_2$)$_n$—(CH$_2$)$_3$NHCN—⌬(CH$_3$)—NCO (n ≈ 20) | 1.58 | 0.43 | 3.7 |
| Example 26 | OCN—⌬(CH$_3$)—NHCN—(CH$_2$)$_3$Si(CH$_3$)$_2$—(O—Si(CH$_3$)$_2$)$_n$—(CH$_2$)$_3$NHCN—⌬(CH$_3$)—NCO (n ≈ 100) | 2.0 | 0.48 | 4.2 |
| Comparative Example 6 | MDI | 0.89 | 0.47 | 1.9 |

EXAMPLE 27

A 1.0% by weight ethylene glycol solution of a polyamine of the following formula

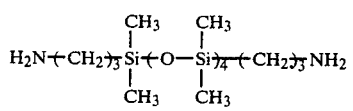

was prepared. The flat microporous supporting film of polysulfone obtained in Referential Example 1 was dipped for 5 minutes in the resulting solution, and withdrawn. A polyethylene sheet was placed on the film and the assembly was compressed with a roller to remove the excess of the amine solution. The film was then dipped for 2 minutes in a 1.0% by weight hexadecene-1 solution of MDI, withdrawn, dried at room temperature for 12 hours, and then dipped in water for 24 hours to wash it. The properties of the film were measured at 25° C., and the results are shown in Table 8.

EXAMPLES 28 TO 37

In each run, a composite film was produced in the same way as in Example 26 except that each of the polyamine compounds and each of the polyisocyanate compounds shown in Table 8 were used. The gas permeating properties of the resulting composite films were evaluated, and the results are shown in Table 8.

TABLE 8

| Example | Polyamine | Polyisocyanate | Gas permeating speed, $Q \times 10^5$ $\left( \dfrac{cc(STP)}{cm^2 \cdot sec \cdot cmHg} \right)$ $Q_{O_2}$ | $Q_{N_2}$ | Selectivity $Q_{O_2}/Q_{N_2}$ |
|---|---|---|---|---|---|
| 27 | $H_2N\!+\!CH_2\!\!\frac{}{3}Si\!+\!OSi\frac{}{n}\!+\!CH_2\!\!\frac{}{3}NH_2$ (n = 4) with CH$_3$ groups | MDI | 3.1 | 1.0 | 3.1 |
| 28 | $H_2N\!+\!CH_2\!\!\frac{}{3}Si\!+\!OSi\frac{}{n}\!+\!CH_2\!\!\frac{}{3}NH_2$ (n = 5) with CH$_3$ groups | MDI | 4.2 | 1.4 | 3.0 |
| 29 | $H_2N\!+\!CH_2\!\!\frac{}{4}Si\!+\!OSi\frac{}{4}\!+\!CH_2\!\!\frac{}{4}NH_2$ with CH$_3$ groups | Isophorone diisocyanate (abbreviated IPDI) | 2.8 | 0.88 | 3.2 |
| 30 | $H_2N\!+\!CH_2\!\!\frac{}{2}Si\!-\!O\!-\!Si\!+\!CH_2\!\!\frac{}{2}NH_2$ with CH$_3$ groups | TDI | 1.0 | 0.21 | 4.8 |
| 31 | $H_2N\!+\!CH_2\!\!\frac{}{3}Si\!-\!O\!+\!Si\!-\!O\frac{}{20}\!Si\!+\!CH_2\!\!\frac{}{3}NH_2$ with CH$_3$ and phenyl groups | MDI | 2.9 | 0.78 | 3.7 |
| 32 | $H_2N\!+\!CH_2\!\!\frac{}{3}Si\!-\!O\!+\!Si\!-\!O\frac{}{10}\!Si\!+\!CH_2\!\!\frac{}{3}NH_2$ with C$_3$H$_7$ and CH$_3$ groups | TDI | 2.4 | 0.59 | 4.1 |
| 33 | $H_2N\!+\!CH_2\!\!\frac{}{3}Si\!-\!O\!+\!Si\!-\!O\frac{}{30}\!Si\!+\!CH_2\!\!\frac{}{3}NH_2$ with CH$_3$ and CH$_2$CH$_2$CF$_3$ groups | Xylene diisocyanate | 2.8 | 0.88 | 3.2 |
| 34 | $H_2N\!+\!CH_2\!\!\frac{}{3}Si\!-\!O\!+\!Si\!-\!O\frac{}{10}\!Si\!+\!CH_2\!\!\frac{}{3}NH_2$ with CH$_3$ and CH$_2$CH$_2$C$_6$F$_{13}$ groups | bis(isocyanato-methyl)cyclohexane | 1.7 | 0.44 | 3.9 |
| 35 | $H_2N\!+\!CH_2\!\!\frac{}{3}Si\!-\!O\!+\!Si\!-\!O\frac{}{150}\!Si\!+\!CH_2\!\!\frac{}{3}NH_2$ with CH$_3$ groups | bis(3-isocyanato-propyl)tetramethyl-disiloxane | 4.5 | 1.5 | 3.0 |

TABLE 8-continued

| Example | Polyamine | Polyisocyanate | Gas permeating speed, $Q \times 10^5$ $\left(\dfrac{cc(STP)}{cm^2 \cdot sec \cdot cmHg}\right)$ | | Selectivity |
|---|---|---|---|---|---|
| | | | $Q_{O2}$ | $Q_{N2}$ | $Q_{O2}/Q_{N2}$ |
| 36 | $H_2N+CH_2)_3Si-O+Si-O)_{10}-Si+CH_2)_3NH_2$ with CH₃ groups and (CH₂)₆CH₃ substituent | MDI | 3.2 | 0.76 | 4.2 |
| 37 | $H_2N+CH_2)_3Si-O+Si-O)_{20}-Si+CH_2)_3NH_2$ with CH₃ groups and CH=CH₂ substituent | MDI | 2.3 | 0.64 | 3.6 |

EXAMPLE 38

Dimethoxymonomethyl-3-piperazinopropylsilane (11.6 parts), 12.2 parts of dimethoxydiphenylsilane and 20 parts of water were reacted in a stream of nitrogen at 70° C. for 4 hours with stirring, and then at 75° C. and 2 mmHg for 3 hours to give an oil having the following structural units.

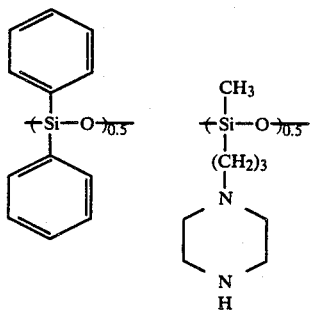

A composite film was produced in the same way as in Example 27 using the resulting amino-containing silicone oil and a polyisocyanate compound of the following formula:

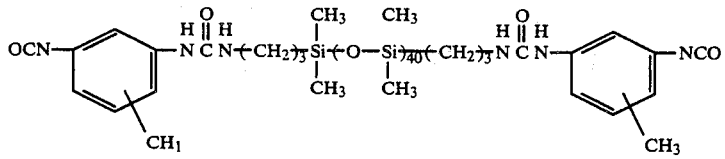

The composite film had an oxygen permeating speed of $1.2 \times 10^{-5}$ cc (STP)/cm²·sec·cmHg and a selectivity $(Q_{O2}/Q_{N2})$ of 3.8.

EXAMPLE 39

A 1% by weight ethylene glycol solution of a polyamine compound of the following formula

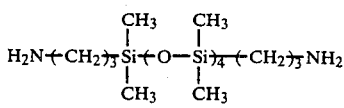

was prepared, and passed for 3 minutes into the cavities of the microporous supporting film of polysulfone in the form of a hollow fiber obtained in Referential Example 3, at a flow rate of 3 cc/min. by means of a metering pump. Thereafter, nitrogen gas was passed into the cavities to purge the excess of the amine solution. Then, a 1% by weight hexadecene solution of MDI was passed into the same cavities at a flow rate of 3 cc/min. for 2 minutes. The excess of the polyisocyanate solution was purged by nitrogen gas. The module was then dipped in water and washed by passing water externally of the hollow fibers, followed by air drying to obtain a hollow fiber film module which had an oxygen permeating speed, a nitrogen permeating speed, a carbon dioxide permeating speed and a helium permeating speed of $4.0 \times 10^{-5}$, $1.24 \times 10^{-5}$, $10.8 \times 10^{-5}$, and $12.9 \times 10^{-5}$ cc(STP)/cm²·sec·cmHg, respectively.

EXAMPLE 40

A composite film in the form of a hollow fiber was produced in the same way as in Example 39 except that the polyamine component used was a compound of the following formula

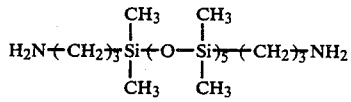

and IPDI was used as the polyisocyanate component. This film had an oxygen permeating speed of $4.4 \times 10^{-5}$ cc(STP)/cm²·sec·cmHg, and a selectivity $(Q_{O2}/Q_{N2})$ of 3.0

EXAMPLE 41

The same polyamine and polyisocyanate as used in Example 39 were used. First, the polyisocyanate solution was passed into the cavities of the microporous supporting film of polysulfone in the form of a hollow fiber, and then the polyamine solution was passed into the cavities, thereby to form a film. The film was washed by passing hexane externally of the hollow fibers. This composite film had an oxygen permeating speed of $1.25 \times 10^{-5}$ cc(STP)/cm$^2$·sec·cmHg and a selectivity ($Q_{O2}/Q_{N2}$) of 3.2.

EXAMPLE 42

A 0.2% by weight ethanol/water (1/1) solution of bis(3-aminopropyl)tetramethyldisiloxane prepared in Example 1, (1) was prepared. A flat microporous supporting film of polyvinylidene fluoride (air permeability 320 seconds; pore diameter on the surface 100 to 300 Å; thickness 330 microns; prepared from a nonwoven polyester fabric and polyvinylidene fluoride in the same way as in Referential Example 1) was dipped for 5 minutes in the resulting solution, withdrawn from it and placed vertically at room temperature for 5 minutes to drain the solution.

The film was then dipped for 3 minutes in a 0.2% by weight hexane solution of polyisocyanate (product of Nippon Poly-Urethane Co., Ltd.) having the following formula

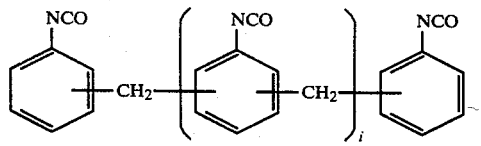

(mixture of i=0, 1, 2, 3, and 4) and dried at room temperature for 60 minutes.

The resulting composite film had an oxygen permeating speed of $2.0 \times 10^{-5}$ cc(STP)/cm$^2$·sec·cmHg and a selectivity ($Q_{O2}/Q_{N2}$) of 4.9.

EXAMPLES 43 TO 46

In each run, the flat microporous supporting film of polysulfone obtained in Referential Example 1 was dipped for 5 minutes in a 1% by weight ethanol/water (8/2) solution of each of the polyamine compounds shown in Table 9, withdrawn, and placed vertically at room temperature for 10 minutes to drain the solution. The film was placed in a vessel. On the other hand, each of the polyisocyanate compounds indicated in Table 9 was put in a three-necked flask and heated at 70° C., and nitrogen was passed into it at a flow rate of about 1 liter/min. A nitrogen stream containing a vapor of the polyisocyanate compound was introduced at room temperature for about 15 minutes into the vessel in which the porous film was placed.

The resulting composite film had the gas permeating properties shown in Table 9.

TABLE 9

| Example | Polyamine compound (viscosity at 25° C.) | | Polyisocyanate compound | O$_2$ permeating speed $Q_{O2} \times 10^5$ (cc(STP)/ cm$^2$·sec·cmHg) | Selectivity ($Q_{O2}/Q_{N2}$) |
|---|---|---|---|---|---|
| 43 | H$_2$N(CH$_2$)$_3$Si(CH$_3$)$_2$(O—Si(CH$_3$)$_2$)$_n$(CH$_2$)$_3$NH$_2$ | n = 3 (24 cst) | Tolylene diisocyanate (TDI) | 2.4 | 5.3 |
| 44 | H$_2$N(CH$_2$)$_3$Si(CH$_3$)$_2$(O—Si(CH$_3$)$_2$)$_n$(CH$_2$)$_3$NH$_2$ | n = 3 | 4,4'-Diphenylmethane diisocyanate (MDI) | 1.9 | 5.4 |
| 45 | H$_2$N(CH$_2$)$_3$Si(CH$_3$)$_2$(O—Si(CH$_3$)$_2$)$_n$(CH$_2$)$_3$NH$_2$ | n = 3 | 4,4'-Diphenylmethane dithioisocyanate | 2.1 | 4.0 |
| 46 | H$_2$N(CH$_2$)$_3$Si(CH$_3$)$_2$(O—Si(CH$_3$)$_2$)$_n$(CH$_2$)$_3$NH$_2$ | n = 8 (100 cst) | Hexamethylene diisocyanate | 4.2 | 4.5 |

EXAMPLE 47

A 2% by weight ethanol solution of polyamine of the following formula

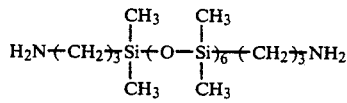

(viscosity 55 cst at 25° C.) was passed into the cavities of the hollow fibers in the module obtained in Referential Example 2 to coat the inside walls of the hollow fibers.

Then, by using the same device as in Example 43, a nitrogen stream containing a vapor of TDI was applied to the amine-coated inside wall of the hollow fibers for 40 minutes to obtain a composite film in the form of a hollow fiber.

The properties of the composite film were measured at 25° C. by a gas permeability measuring device using a gas chromatogram. It had an oxygen permeating speed of $3.1 \times 10^{-5}$ cc(STP)/cm$^2$·sec·cmHg, and a selectivity ($Q_{O2}/Q_{N2}$) of 4.6

COMPARATIVE EXAMPLE 7

A composite film was produced in the same way as in Example 43 except that polyethylenimine (having a viscosity of 2000 centistokes at 25° C.) was used instead of the siloxane-containing diamine. This film had an oxygen permeating speed of $1.1 \times 10^{-6}$ cc(STP)/cm$^2$·sec·cmHg and a selectivity ($Q_{O2}/Q_{N2}$) of 2.8.

EXAMPLE 48

Diphenylmethane diisocyanate was dissolved in n-hexane to prepare a 1% by weight solution. The porous polysulfone film obtained in Referential Example 1 was fully dried, and then dipped in this solution for 5 minutes. The polysulfone film was withdrawn from the n-hexane solution and placed vertically for 15 seconds to drain the solution.

Separately, bis(3-aminopropyl)hexadecamethyloctasiloxane (corresponding to the polyamine used in Example 43 in which n in the formula is 7) was dissolved in a 1:1 mixture of ethanol and isopropanol to form a solution having a concentration of 1 g/100 ml.

The polysulfone film after draining was dipped for 3 minutes in the ethanol/isopropanol solution of the amine, and dried for about 60 minutes in a dry box kept at 23° C. and 65% RH.

Thus, a composite film composed of the polysulfone porous polysulfone film and polyurea having dimethylsiloxane units formed on the polysulfone film was obtained.

The composite film had an oxygen permeating speed of $1.3 \times 10^{-5}$ (cc/cm$^2$·sec·cmHg) and a selectivity ($Q_{O2}/Q_{N2}$) of 4.2.

EXAMPLE 49 bis(3-isocyanatopropyl)tetramethyldisiloxane was dissolved in n-hexane to prepare a 1% by weight solution. The porous polysulfone film obtained in Referential Example 1 was dipped for 8 minutes in this solution, withdrawn, and placed vertically for 20 seconds to drain the solution.

The polysulfone film was dipped for 3 minutes in a 0.5% by weight aqueous solution of 2,2,4-trimethylhexamethylenediamine, and dried in the same way as in Example 48.

The resulting film had an oxygen permeating speed of $0.86 \times 10^{-5}$ (cc/cm$^2$·sec·cmHg) and a selectivity $Q_{O2}/Q_{N2}$) of 4.8.

EXAMPLE 50

0.3 Part of bis(3-aminopropyl)tetramethyldisiloxane was dissolved in 30 parts of ethanol, and 70 parts of water was further added. The mixture was stirred to form a uniform solution. The porous polysulfone film obtained in Referential Example 1 was fully washed with water, and then dipped in this solution for 6 minutes. The polysulfone film was then withdrawn from the water/ethanol solution, and dried for 10 minutes in an atmosphere kept at 23° C. and 65% RH while being placed vertically. The film was further dipped for 3 minutes in a 0.3% by weight n-hexane solution of 4,4'-diphenylmethane diisocyanate to form a polyurea film as a first layer on the polysulfone film, and dried at room temperature for 30 minutes.

Then, a 0.04% by weight water/ethanol (70/30) solution of bis(3-aminopropyl)tetramethyldisiloxane was prepared, and the polysulfone film having the polyurea film as a first layer was dipped for 4 minutes in the resulting solution, and dried for 4 minutes in the same way as in the first layer polyurea film. Then, it was dipped for 2 minutes in a 0.04% by weight n-hexane solution of 4,4'-diphenylmethane diisocyanate to form a polyurea film as a second layer on the first layer, and dried at room temperature for 60 minutes. By taking a photograph of the cross-section of the resulting product through a scanning electron microscope, it was determined that the composite film had a film thickness of 0.16 micron.

The composite film had an oxygen permeating speed of $1.1 \times 10^{-5}$ (cc/cm$^2$·sec·cmHg) and a selectivity ($Q_{O2}/Q_{N2}$) of 5.8.

COMPARATIVE EXAMPLE 8

20.6 Parts of N-2-aminoethyl-3-aminopropyldimethoxymethylsilane and 20 parts of water were reacted in a stream of nitrogen at 70° C. for 4 hours with stirring. Then, the inside of the reaction system was maintained at a vacuum of 0.5 mmHg, and the reaction was continued for 3 hours at 75° C. to obtain an amino-modified silicon oil.

Two parts of the amino-modified silicon oil was dissolved in 98 parts of water. The solution was poured onto the flat microporous supporting film of polysulfone obtained in Referential Example 1. The film was placed vertically for 30 seconds to drain the solution, and dried in a hot air dryer at 80° C. for 20 minutes. Then, a solution of 0.1 part of tolylene diisocyanate in 500 parts of n-hexane was poured onto the dried film, and 30 seconds later, placed vertically to drain the solution for 1 minute. The film was dried in a hot air dryer at 120° C. for 10 minutes.

The resulting product had an oxygen permeating speed of $8.3 \times 10^{-5}$ cc(STP)/cm$^2$·sec·cmHg, and a selectivity ($Q_{O2}/Q_{N2}$) of 0.99.

EXAMPLES 51 TO 54

In each run, 8.7 parts of each of the polyamine compounds shown in Table 10 was dissolved in 59 parts of dimethylacetamide, and with stirring at room temperature, 8.75 parts of each of the polyisocyanate compounds shown in Table 10 was added. The mixture was stirred at 120° C. for 5 hours to form silicon-containing polyurea.

The logarithmic viscosity of the polymer determined at 30° C. for its N-methyl-2-pyrrolidone solution in a concentration of 0.5 g/100 ml is shown in Table 10.

A 25% by weight dimethylacetamide solution of the polymer was prepared, cast on a Teflon plate, and dried at 150° C. for 1 hour to form a film. The thickness, gas permeating coefficient (P) and the gas permeating selectivity ($P_{O2}/P_{N2}$) of the film are shown in Table 10.

TABLE 10

| Example | Polyamine (parts by weight) $H_2N+CH_2\!\!+\!\!_3Si+OSi+\!\!_n+CH_2+\!\!_3NH_2$ with $CH_3$ groups | | Polyisocyanate (parts by weight) | Logarithmic viscosity of the polymer | Film thickness ($\mu$) | Gas permeation coefficient P × 10$^{10}$ $\left(\frac{cc(STP)\cdot cm}{cm^2 \cdot sec \cdot cmHg}\right)$ | | Selectivity $P_{O2}/P_{N2}$ |
|---|---|---|---|---|---|---|---|---|
| | | | | | | $P_{O2}$ | $P_{N2}$ | |
| 51 | n = 1 | (8.7) | MDI (8.75) | 1.17 | 38 | 1.17 | 0.185 | 6.32 |
| 52 | n = 1 | (8.7) | TDI (6.1) | 1.02 | 32 | 1.12 | 0.183 | 6.12 |
| 53 | n = 3 | (12.7) | MDI (8.75) | 0.87 | 40 | 1.83 | 0.343 | 5.33 |
| 54 | n = 1 | (8.45) | " (*2) | 0.93 | 28 | 1.22 | 0.187 | 5.45 |

TABLE 10-continued

| Example | Polyamine (parts by weight) $H_2N+CH_2 \ni_3 Si+OSi \ni_n +CH_2 \ni_3 NH_2$ with $CH_3$ groups | Polyisocyanate (parts by weight) | Logarithmic viscosity of the polymer | Film thickness ($\mu$) | Gas permeation coefficient $P \times 10^{10}$ $\left( \frac{cc(STP) \cdot cm}{cm^2 \cdot sec \cdot cmHg} \right)$ $P_{O_2}$   $P_{N_2}$ | | Selectivity $P_{O_2}/P_{N_2}$ |
|---|---|---|---|---|---|---|---|
| | Hexamethylene-diamine | (0.7) (*1) | (10) | | | | |

(*1) Dissolved in 70 parts of dimethylacetamide.
(*2) After addition, the mixture was stirred at 120° C. for 4 hours.

EXAMPLES 55 TO 62

In each run, 8.7 parts of each of the polyamine compounds shown in Table 11 was dissolved in 58.5 parts of dimethylacetamide, and with stirring at room temperature, 8.75 parts of MDI was added. The mixture was stirred at 120° C. for 3 hours to form polyurea.

The logarithmic viscosity of the polymer was determined at 30° C. for its solution in N-methyl-2-pyrrolidone in a concentration of 0.5 g/100 ml. The results are shown in Table 11.

A 25% by weight dimethylacetamide solution of this polymer was cast on a Teflon plate and dried at 150° C. for 1 hour. The thickness, gas permeation coefficient and selectivity of this film are shown in Table 11.

$$H_2N+CH_2 \ni_3 Si+O-Si \ni_{50} +CH_2 \ni_3 NH_2$$
with $CH_3$ substituents was dissolved in 80 parts of chloroform, and with stirring, added dropwise to a solution of 5 parts of TDI in 25 parts of chloroform. After the addition, the mixture was stirred further for 30 minutes. By a vacuum distillation device, chloroform and the excess of TDI were distilled off to give 10.8 parts of a liquid reaction product. By the reaction of a solution of 10 parts of the reaction product in 190 parts of chloroform with a solution of 0.27 part of hexamethylenediamine in 5.4 parts of TABLE 11 - (a)

| Example | Polyamine $H_2N+CH_2 \ni_3 Si+OSi \ni_n +CH_2 \ni_3 NH_2$ | Logarithmic viscosity of the polymer | Film thickness [$\mu$] | $P_{O_2} \times 10^{10}$ $\left[ \frac{cc(STP) \cdot cm}{cm^2 \cdot sec \cdot cmHg} \right]$ | Selectivity $P_{O_2}/P_{N_2}$ |
|---|---|---|---|---|---|
| 55 | n = 2 | 0.78 | 200 | 3.1 | 4.5 |
| 56 | n = 3 | 0.71 | 127 | 7.5 | 4.0 |
| 57 | n = 4 | 0.60 | 94 | 1.3 | 3.1 |
| 58 | n = 5 | 0.48 | 131 | 2.5 | 3.2 |

TABLE II - (b)

| Example | Polyamine $H_2N+CH_2 \ni_3 Si+O-Si \ni_n +CH_2 \ni_3 NH_2$ | Polyisocyanate | Logarithmic viscosity of the polymer | $P_{O_2} \times 10^{10}$ $\left[ \frac{cc(STP) \cdot cm}{cm^2 \cdot sec \cdot cmHg} \right]$ | Selectivity $P_{O_2}/P_{N_2}$ |
|---|---|---|---|---|---|
| 59 | n = 4 | IPDI | 0.37 | 4.9 | 3.1 |
| 60 | n = 5 | 1,3-bis-(isocyanatomethyl)-cyclohexane | 0.32 | 4.5 | 3.0 |
| 61 | n = 4 | bis(3-isocyanatopropyl)tetramethyldisiloxane/IPDI (2/1 in mole ratio) | 0.42 | 4.8 | 3.3 |
| 62 | n = 5 | bis(3-isocyanatopropyl tetramethyldisiloxane/IPDI (2/1 in mole ratio) | 0.25 | 8.1 | 2.7 |

EXAMPLE 63

Twenty parts of polyamine of the following formula water, polyurea was obtained. This polyurea had a logarithmic viscosity, determined in chloroform at 25° C., of 0.4. A solution of 15 parts of the polyurea in 85 parts of chloroform was cast on a glass plate, dried, and then heat-treated at 120° C. for 1 hour to form a transparent film. The film had a thickness of 35 μm. Its gas permeation coefficient at 25° C. is shown in Table 12.

EXAMPLE 64

Twenty parts of silanol of the following formula

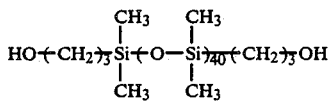

was dissolved in 180 parts of chloroform, and in the same way as in Example 63, the solution was added dropwise to 100 parts of a 20% by weight chloroform solution of 2,4-tolylene diisocyanate. In the same way as in Example 63, a liquid reaction product having an isocyanate group at the terminals was obtained. A solution of 10 parts of the reaction product in 60 parts of chloroform was prepared, and a solution of 4.7 parts of polyamine of the following formula

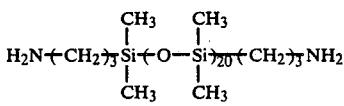

in 30 parts of chloroform was added dropwise to the above solution. The mixture was stirred at 50° C. for 5 hours. The resulting polymer had a logarithmic viscosity, determined in chloroform at 30° C., of 0.4. A 15% by weight chloroform solution of the polymer was cast on a glass plate and dried to form a transparent film having a thickness of 25 μm. The properties of the film are shown in Table 12.

EXAMPLE 65

A solution of 10 parts of silanol of the following formula

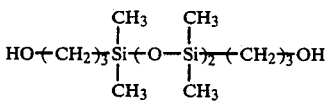

in 9.0 parts of dimethylformamide was added dropwise to a solution of 80 parts of MDI in 320 parts of dimethylformamide in the same way as in Example 63. The reaction mixture was distilled, and 18.3 parts of a liquid reaction product was obtained as a distillation residue. A solution of 2.86 parts of trimethylhexamethylenediamine in 20 parts of dimethylformamide was added dropwise to a solution of 10 parts of the reaction product in 60 parts of dimethylformamide in a stream of nitrogen at 40° C. with stirring. The mixture was further stirred at 80° C. for 5 hours to form a polymer. This polymer had a logarithmic viscosity, determined in dimethylformamide at 30° C., of 0.7. A 15% by weight dimethylformamide solution of the polymer was cast on a glass plate, and dried in a hot air dryer to form a transparent film having a thickness of 22 μm. The properties of the film are shown in Table 12.

EXAMPLE 66

A solution of 10 parts of a compound of the following formula

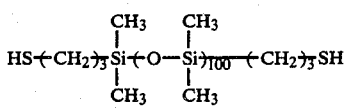

in 90 parts of chloroform was added dropwise to a solution of 5 parts of 2,4-tolylene diisocyanate in 20 parts of chloroform in a stream of nitrogen at 0° C. The reaction solution was distilled in the same way as in Example 63 to give 10.4 parts of a liquid reaction product. A solution of 5.0 parts of polyamine of the following formula

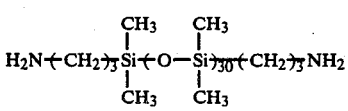

in 20 parts of chloroform was added dropwise to a solution of 10 parts of the reaction product in 60 parts of chloroform with stirring at 30° C. The reaction was continued under reflux for 8 hours to give a polymer. The polymer had a logarithmic viscosity, determined in chloroform at 30° C., of 0.5. A 15% by weight chloroform solution of the polymer was cast on a glass plate, and dried to give a transparent film having a thickness of 30 μm. The properties of the film are shown in Table 12.

TABLE 12

| | Gas permeation coefficient $P \times 10^9$ [cc (STP) cm/cm$^2$ · sec · cmHg] | | Selectivity |
|---|---|---|---|
| Example | $P_{O_2}$ | $P_{N_2}$ | ($P_{O_2}/P_{N_2}$) |
| 63 | 4.55 | 1.72 | 2.65 |
| 64 | 10.3 | 4.68 | 2.20 |
| 65 | 1.20 | 0.28 | 4.27 |
| 66 | 9.72 | 4.38 | 2.22 |

EXAMPLES 69 TO 71

In each run, 6.3 parts of each of the polyamine compounds indicated in Table 13 was dissolved in 80 parts of dimethylacetamide, and with stirring in an atmosphere of nitrogen at room temperature, 13.5 parts of each of the polyisocyanate compounds shown in Table 13 was added. Then, the mixture was stirred at 120° C. for 3 hours to give polyurea.

The logarithmic viscosity of the polymer was determined at 30° C. for its solution in N-methyl-2-pyrrolidone in a concentration of 0.5 g/100 ml, and the results are shown in Table 13.

A 20% by weight dimethylacetamide solution of the polymer was cast on a Teflon plate, and dried at 150° C. for 1 hour to give a homogeneous film. The thickness, the oxygen permeation coefficient ($P_{O_2}$) and selectivity of the film are shown in Table 13.

TABLE 13

| Example | Polyamine (parts by weight) | Polyisocyanate (parts by weight) $OCN(CH_2)_3Si(CH_3)_2(OSi(CH_3)_2)_n(CH_2)_3NCO$ | Logarithmic viscosity of the polymer | Film thickness (μ) | Oxygen permeation coefficient $P_{O_2} \times 10^{10}$ $\left(\frac{cc(STP) \cdot cm}{cm^2 \cdot sec \cdot cmHg}\right)$ | Selectivity $P_{O_2}/P_{N_2}$ |
|---|---|---|---|---|---|---|
| 67 | 2,2,4-Trimethylhexamethylenediamine (6.3) | n = 1 (13.5) | 1.02 | 65 | 2.4 | 5.9 |
| 68 | Isophoronediamine (6.8) | n = 1 (13.5) | 0.91 | 95 | 3.1 | 4.8 |
| 69 | bis(3-aminopropyl)tetramethyldisiloxane (7.5 parts) and 4,4'-diaminodiphenylmethane (2.0 parts) (*1) | n = 2 (*2) (16.8) | 0.96 | 80 | 6.7 | 5.1 |
| 70 | 2,2,4-Trimethylhexamethylenediamine (6.3) (*3) | n = 3 (20.2) | 0.84 | 59 | 5.4 | 4.3 |
| 71 | bis(3-aminopropyl)decamethylpentasiloxane (18.8) | n = 1 (13.5) | 0.67 | 83 | 35 | 4.2 |

(*1) Dissolved in 90 parts of dimethylacetamide.
(*2) After addition, the mixture was stirred at 120° C. for 2 hours and at 130° C. for 2 hours.
(*3) Dissolved in 80 parts of N—methyl-2-pyrrolidone.

EXAMPLE 72

Polyurea was obtained in the same way as in Example 67 except that bis(3-aminopropyl)tetramethyldisiloxane was used instead of 2,2,4-trimethylhexamethylenediamine. The resulting polymer had a logarithmic viscosity of 0.88. The properties of a film obtained in the same way as in Example 67 are shown in Table 14.

TABLE 14

| Gas | Permeation coefficient P [cc (STP) · cm/ cm² · sec · cmHg] | Selectivity ($P/P_{N_2}$) |
|---|---|---|
| Carbon dioxide | $2.5 \times 10^{-9}$ | 19.2 |
| Oxygen | $8.4 \times 10^{-10}$ | 6.5 |
| Argon | $4.0 \times 10^{-10}$ | 3.1 |
| Nitrogen | $1.3 \times 10^{-10}$ | 1.0 |

EXAMPLE 73

30.5 Parts of polyisocyanate of the following formula

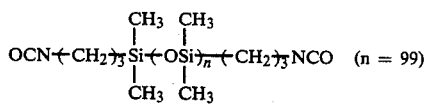

$OCN(CH_2)_3Si(CH_3)_2(OSi(CH_3)_2)_n(CH_2)_3NCO$  (n = 99)

was dissolved in 85 parts of chloroform, and the solution was stirred in an atmosphere of nitrogen. A solution of 0.71 part of trimethylhexamethylenediamine in 15 parts of chloroform was added dropwise slowly to the above solution at room temperature. In 30 minutes, a viscous chloroform solution of polyurea was obtained.

This polyurea solution was cast on a Teflon plate and dried at 150° C. for 1 hour in the same way as in Example 67 to give a homogeneous film. This film had an oxygen permeation coefficient ($P_{O_2}$) of $3.4 \times 10^{-8}$ [cc(STP)·cm/cm²·sec·cmHg] and a selectivity ($P_{O_2}/P_{N_2}$) of 2.24.

EXAMPLE 74

15.3 Parts of polyamine of the following formula

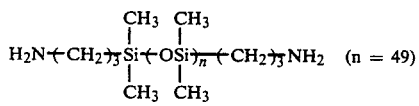

$H_2N(CH_2)_3Si(CH_3)_2(OSi(CH_3)_2)_n(CH_2)_3NH_2$  (n = 49)

was dissolved in 60 parts of chloroform, and the solution was stirred in an atmosphere of nitrogen. A solution of 1.2 parts of bis(3-isocyanatopropyl)tetramethyldisiloxane in 15 parts of chloroform was added dropwise slowly at room temperature to the above solution to react the polyamine and the polyisocyanate. After the lapse of 45 minutes, a viscous chloroform solution of polyurea was formed. The polyurea solution was cast in the same way as in Example 67 to obtain a homogeneous film.

This film had an oxygen permeation coefficient ($P_{O_2}$) of $1.3 \times 10^{-8}$ (cc(STP)·cm/cm²·sec·cmHg) and a selectivity ($P_{O_2}/P_{N_2}$) of 2.36.

COMPARATIVE EXAMPLE 9

Polyurea was produced in the same way as in Example 70 except that 7.9 parts of 4,4'-diaminodiphenylmethane was used instead of 2,2,4-trimethylhexamethylenediamine, and 11.3 parts of MDI was used instead of bis(3-isocyanatopropyl)tetramethyldisiloxane. The polymer had a logarithmic viscosity of 1.04. A film obtained in the same way as in Example 70 had an oxygen permeation coefficient ($P_{O_2}$) of $8.9 \times 10^{-12}$ [cc(STP)·cm/cm²·sec·cmHg] which was low.

What is claimed is:

1. An ultrathin film composed substantially of silicon-containing polyurea comprising polyaddition bonded units derived from
   (A) at least one polyamine selected from the group consisting of silicon-containing polyamines having in the molecule at least two units of the following formula

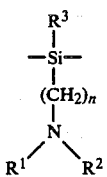  (I)

wherein $R^3$ represents a monovalent hydrocarbon group or a fluorocarbon group, $R^1$ and $R^2$ are identical or different and represent a hydrogen atom or a monovalent hydrocarbon group which may have a primary or secondary amino group, or $R^1$ and $R^2$ may be bonded to each other to form an alkylene group interrupted by the nitrogen atom forming the secondary amino group, and n is an integer of 1 to 10, provided that $R^1$ and $R^2$ are not simultaneously aliphatic, alicyclic or aromatic groups free from the amino group,
not all, but at least one, of the units of formula (I) forming a unit represented by the following formula

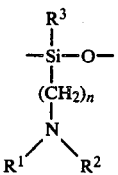  (I)-a wherein $R^1$, $R^2$, $R^3$ and n are as defined, the free bond from the silicon atom is bonded directly to another carbon atom or another oxygen atom, and the free bond from the oxygen is bonded directly to another siloxane atom,
and hydrocarbon-type polyamines containing at least two primary or secondary amino groups in the molecule, and
   (B) at least one polyisocyanate compound selected from the group consisting of silicon-containing polyisocyanates having at least 2 isocyanate groups in the molecular chains and hydrocarbon-type polyisocyanates having at least 2 isocyanate groups in the molecular chains;
provided that when the polyisocyanate compound is the hydrocarbon-type polyisocyanate alone, at least one of the selected polyamines is a silicon-containing polyamine containing in the molecule at least one unit of formula (I)-a in which the free bond from the silicon atom is bonded to a monovalent hydrocarbon group.

2. The film of claim 1 wherein the silicon-containing polyamine has a unit of the following formula

  (II)

wherein $R^4$ and $R^5$ are identical or different and represents a monovalent hydrocarbon group or a fluorocarbon group, in addition to the units of formulae (I) and (I)-a.

3. The film of claim 1 wherein in formulae (I) and (I)-a, $R^3$ is an alkyl group having 1 to 10 carbon atoms, a cycloalkyl group having 5 or 6 carbon atoms, a phenyl group or a tolyl group, or a corresponding fluorocarbon group resulting from substitution of each said hydrocarbon group by fluorine.

4. The film of claim 1 wherein in formulae (I) and (I)-a, at least one of $R^1$ and $R^2$ is a hydrogen atom.

5. The film of claim 1 wherein in formulae (I) and (I)-a, the hydrocarbon group respresented by $R^1$ and $R^2$ which may have a primary or secondary amino group is an alkyl group having 1 to 12 carbon atoms, an alicyclic group having 6 to 15 carbon atoms, an aromatic group having 6 to 15 carbon atoms, or an aralkyl group having 7 to 15 carbon atoms which may have a primary or secondary amino group.

6. The film of claim 1 wherein in formulae (I) and (I)-a, n is 2 to 6.

7. The film of claim 1 wherein the silicon-containing polyamine is represented by the following formula

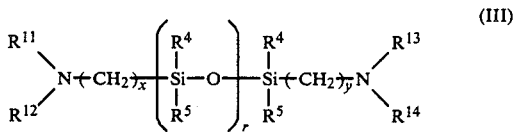  (III)

wherein $R^4$ and $R^5$ are identical or different and each represents a monovalent hydrocarbon group or a fluorocarbon group, $R^{11}$, $R^{12}$, $R^{13}$ and $R^{14}$ are identical or different and are selected from the group defined for $R^1$ and $R^2$, x and y are identical or different and represent an integer of 1 to 10, and r is a number of 1 to 250.

8. The film of claim 1 wherein the silicon-containing polyamine is represented by the following formula

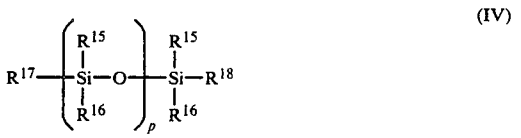  (IV)

wherein $R^{15}$ and $R^{16}$ are identical or different and each represents a monovalent hydrocarbon group, a fluorocarbon group or a group of the formula

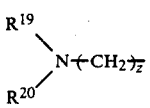  (a)

in which $R^{19}$ and $R^{20}$ are identical or different and are selected from the groups defined for $R^1$ and $R^2$ above and z is an integer of 1 to 10, $R^{17}$ and $R^{18}$ are identical or different and each represents a hydroxyl group, a monovalent hydrocarbon group, a fluorocarbon group, or a monovalent hydrocarbon-O—group, and p is a number of 1 to 250, provided that $R^{15}$ and $R^{16}$ bonded to the silicon atoms are not simultaneously the group of formula (a), and the compound of formula (IV) contains at least two primary or secondary amino groups based on the group of formula (a).

9. The film of claim 1 wherein the hydrocarbon-type polyamine is an aliphatic diamine having 2 to 12 carbon atoms, an aliphatic triamine having 4 to 12 carbon atoms, an aliphatic tetramine having 4 to 12 carbon atoms, an alicyclic diamine having 6 to 15 carbon atoms, or an aromatic diamine having 6 to 15 carbon atoms.

10. The film of claim 1 wherein the siloxane-containing polyisocyanate compound is represented by the following formula

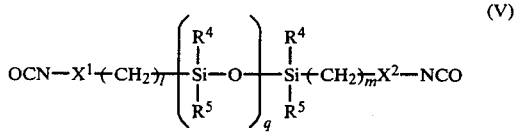

wherein $R^4$ and $R^5$ are identical or different and represent a monovalent hydrocarbon group or a fluorocarbon group, $X^1$ and $X^2$ are identical or different and represent a single bond, or a group of the following formula

wherein $Y^3$ represents a hydrocarbon group having 3 to 15 carbon atoms, $Z^3$ represents

—O— or —S—, $R^8$ represents a hydrogen atom or a hydrocarbon group having 1 to 6 carbon atoms, provided that $Y^3$ in the group of formula (b) is bonded to the isocyanate group of formula in formula (V), l and m are identical or different and represent an integer of 1 to 10, and q is a number of 1 to 250.

11. The film of claim 1 wherein the hydrocarbon-type polyisocyanate is an aliphatic diisocyanate having 3 to 17 carbon atoms, an alicyclic diisocyanate having 8 to 17 carbon atoms, an aralkyl diisocyanate having 9 to 17 carbon atoms, a monocyclic or dicyclic aromatic diisocyanate having 8 to 17 carbon atoms, a tricyclic or higher aromatic tri- to dodeca-isocyanate having about 23 to about 100 carbon atoms.

12. The film of claim 1 wherein the silicon-containing polyurea consists substantially of said polyaddition bonded units.

13. The film of claim 1 which has a thickness of about 0.01 to about 1 micron.

14. The film of claim 1 which has a thickness of about 0.03 to about 0.5 micron.

15. A composite structure composed of a microporous supporting film and the film of claim 1 supported on said supporting film.

16. The composite structure of claim 15 which is in the form of a hollow fiber.

17. The composite structure of claim 15 which is in the form of a flat membrane.

18. A process for producing a composite structure composed of a microporous supporting film and an ultrathin film supported thereon, which comprises subjecting at least one of the polyamines defined in claim 1 and at least one of the polyisocyanate compounds defined in claim 1 to interfacial polyaddition reaction on a microporous supporting film to form an ultrathin film composed substantially of a silicon-containing polyurea on the microporous supporting film, wherein when the polyisocyanate compound is the hydrocarbon-type polyisocyanate alone, a silicon-containing polyamine having in the molecule at least one unit of formula (I)-a in which the free bond from the silicon atom is bonded to a monovalent hydrocarbon group is used as at least a part of the polyamine.

19. The process of claim 18 which comprises applying a solution of at least one of the polyamines defined in claim 1 in a solvent capable of dissolving said polyamine to the microporous supporting film to form a layer of the solution on the surface of the porous supporting film, then applying the polyisocyanate compound in the form of a solution in a solvent capable of dissolving said polyisocyanate compound and being substantially immiscible with the solvent of the polyamine solution, or in the form of a vapor in an inert gas, to the solution layer, thus subjecting the polyamine and the polyisocyanate compound to interfacial polyaddition reaction to form a silicon-containing polyurea on the microporous supporting film.

20. A composite structure composed of a microporous supporting film for the production of a gaseous mixture containing a specified gas in a high concentration from a mixture of two or more gases including said specified gas, wherein said microporous supporting film is made up of the film of claim 1.

21. The use of claim 20 for the production of a gaseous mixture containing oxygen, helium or argon, and carbon dioxide or hydrogen respectively from air, a gaseous mixture composed mainly of helium or argon and nitrogen, a gaseous mixture containing consisting mainly of carbon dioxide and nitrogen, or a gaseous mixture consisting mainly of hydrogen, carbon monoxide and methane.

* * * * *